(12) United States Patent
Feie et al.

(10) Patent No.: US 12,467,369 B2
(45) Date of Patent: Nov. 11, 2025

(54) COMPOSITE COMPONENT HAVING AN ADDITIVELY PRINTED INNER PORTION

(71) Applicant: General Electric Company, Schenectady, NY (US)

(72) Inventors: Brian Gregg Feie, Cincinnati, OH (US); Michael Ray Tuertscher, South Lebanon, OH (US); Daniel Gene Dunn, Guilderland, NY (US); Reza Sarrafi-Nour, Clifton Park, NY (US); Douglas Glenn Decesare, Queensbury, NY (US); Henry Charles McGuigan, Duanesburg, NY (US); Matthew Hockemeyer, Ballston Spa, NY (US); Steven James Murphy, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/453,564

(22) Filed: Aug. 22, 2023

(65) Prior Publication Data

US 2025/0067186 A1    Feb. 27, 2025

(51) Int. Cl.
*F01D 5/28* (2006.01)
*F01D 5/18* (2006.01)

(52) U.S. Cl.
CPC .............. *F01D 5/282* (2013.01); *F01D 5/18* (2013.01); *F05D 2230/314* (2013.01); *F05D 2260/20* (2013.01); *F05D 2300/6033* (2013.01)

(58) Field of Classification Search
CPC ............. F01D 5/18; F01D 5/288; F01D 5/282
See application file for complete search history.

(56) References Cited

U.S. PATENT DOCUMENTS

| | | | |
|---|---|---|---|
| 3,533,712 A | 10/1970 | Kercher | |
| 6,627,019 B2 | 9/2003 | Jarmon et al. | |
| 6,984,100 B2 | 1/2006 | Bunker et al. | |
| 7,435,053 B2 | 10/2008 | Liang | |
| 7,670,113 B1 | 3/2010 | Liang | |
| 8,052,378 B2 * | 11/2011 | Draper | F01D 5/186 |
| | | | 415/121.2 |
| 8,167,537 B1 | 5/2012 | Plank et al. | |
| 9,683,443 B2 | 6/2017 | Freeman et al. | |
| 9,976,441 B2 * | 5/2018 | Lacy | F01D 25/12 |

(Continued)

FOREIGN PATENT DOCUMENTS

| | | |
|---|---|---|
| GB | 2532704 A | 6/2016 |
| WO | WO2019179702 A1 | 9/2019 |
| WO | WO2021/067978 A1 | 4/2021 |

*Primary Examiner* — Michael L Sehn
(74) *Attorney, Agent, or Firm* — Dority & Manning, P.A.

(57) ABSTRACT

A composite component for a gas turbine engine is provided, along with its methods of formation. The composite component includes: an additively printed inner portion defining at least one flowpath feature, and a ceramic matrix composite (CMC) outer portion formed on the additively printed inner portion such that the CMC outer portion substantially surrounds the additively printed inner portion. The additively printed inner portion includes SiC; and the CMC outer portion includes a fiber reinforced ceramic matrix (e.g., including SiC) and defines at least one cooling cavity fluidly coupled to the at least one flowpath feature of the additively printed inner portion.

19 Claims, 15 Drawing Sheets

(56) References Cited

U.S. PATENT DOCUMENTS

| | | |
|---|---|---|
| 10,260,354 B2 | 4/2019 | Bunker |
| 10,287,894 B2 | 5/2019 | Dutta et al. |
| 10,384,981 B2 | 8/2019 | Hall et al. |
| 10,472,973 B2 | 11/2019 | Dutta et al. |
| 10,577,943 B2 | 3/2020 | Marinelli et al. |
| 10,583,489 B2 | 3/2020 | Morgan et al. |
| 10,590,776 B2 | 3/2020 | Dutta et al. |
| 10,605,095 B2 * | 3/2020 | Gallier .................... F01D 5/284 |
| 10,612,391 B2 | 4/2020 | Rathay et al. |
| 11,021,971 B2 | 6/2021 | Holowczak et al. |
| 11,047,240 B2 | 6/2021 | Frey et al. |
| 2014/0093379 A1 | 4/2014 | Tibbott et al. |
| 2017/0009600 A1 | 1/2017 | Grasso et al. |
| 2017/0328216 A1 | 11/2017 | Gallier |
| 2018/0065337 A1 | 3/2018 | Grasso et al. |
| 2019/0330988 A1 | 10/2019 | Hillier |
| 2020/0011190 A1 | 1/2020 | Read |
| 2020/0299200 A1 | 9/2020 | Sheedy et al. |
| 2021/0001511 A1 | 1/2021 | Jin et al. |
| 2021/0156265 A1 | 5/2021 | Rathay et al. |
| 2021/0189886 A1 | 6/2021 | Dyson et al. |
| 2021/0189901 A1 | 6/2021 | Dyson et al. |
| 2021/0254475 A1 | 8/2021 | Dyson et al. |
| 2023/0193764 A1 | 6/2023 | Liles et al. |

\* cited by examiner

COMPOSITE COMPONENT HAVING AN ADDITIVELY PRINTED INNER PORTION

FIELD

The present disclosure relates to a composite component including an additively printed inner portion.

BACKGROUND

Reinforced ceramic matrix composites ("CMCs") comprising fibers dispersed in continuous ceramic matrices of the same or a different composition are well-suited for structural applications because of their toughness, thermal resistance, high-temperature strength, and chemical stability. Such composites typically have high strength-to-weight ratios that render them attractive in applications in which weight is a concern, such as in aeronautic applications. Their stability at high temperatures renders CMCs very suitable in applications in which components are in contact with a high-temperature gas, such as in a gas turbine engine. However, ceramic fibers used to form a fiber-reinforced CMC material can be expensive. Additionally, cooling fiber-reinforced composites can be difficult. Accordingly, improved components addressing one or more of these challenges would be desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DEFINITIONS

Figure 1:
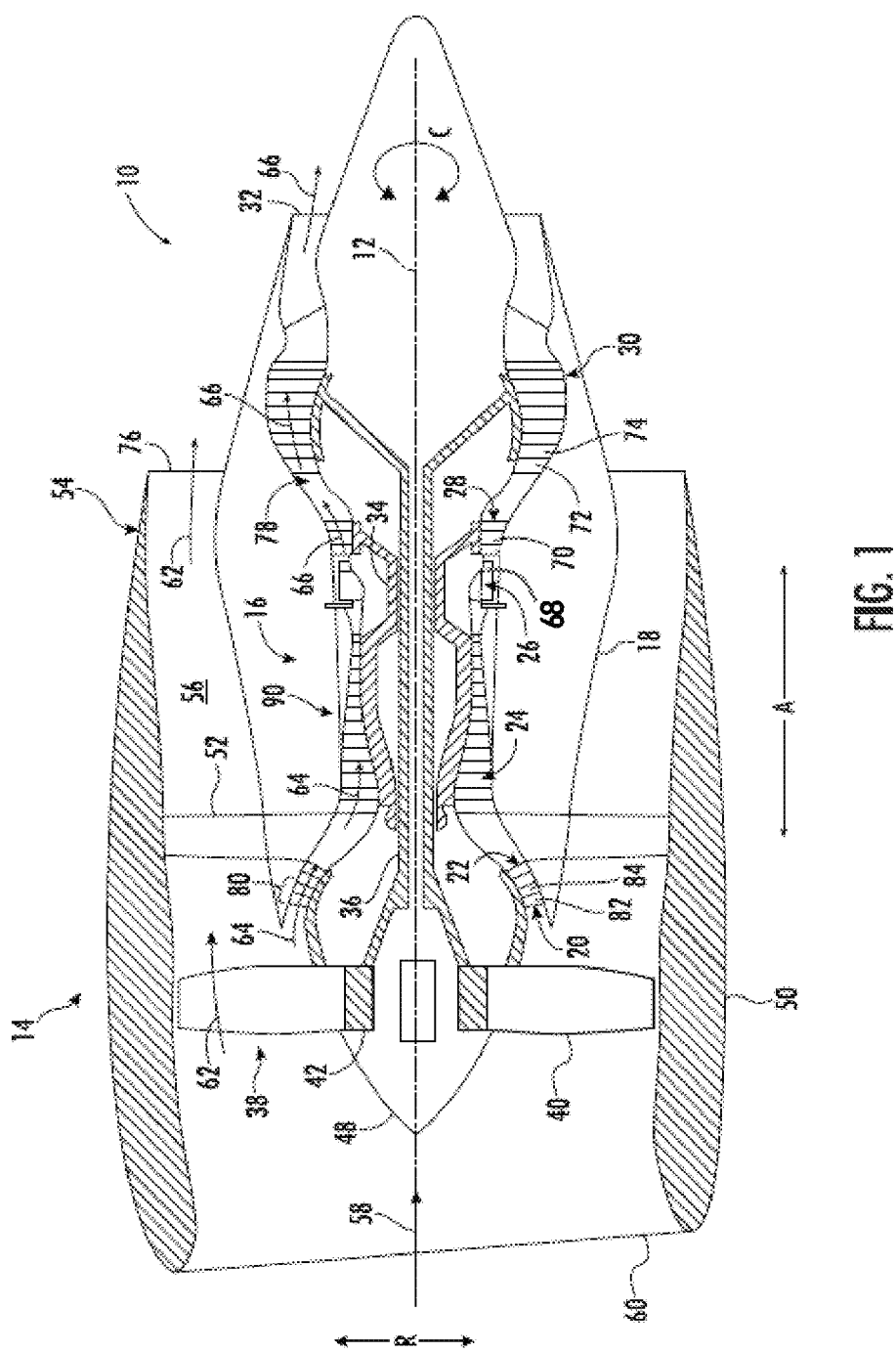
FIG. 1 is a schematic cross-sectional view of a gas turbine engine in accordance with an exemplary aspect of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more non-structural layers, and the one or more nonstructural layers contacting the a second wall/surface).

As used herein, the terms "integral," "unitary," or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a ply layup process, a casting process, etc.

As used herein, the term "build plane" refers to a plane defined by a surface upon which an energy beam impinges to selectively irradiate and thereby consolidate powder material during an additive manufacturing process.

As used herein, the term "consolidate" or "consolidating" refers to solidification of powder material as a result of irradiating the powder material, including by way of melting, fusing, sintering, or the like.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

As used herein, the terms "substantially surrounds" and "substantially surrounding" means that the inner portion has at least 90% of its surface area covered by the CMC outer portion, such as 95% of its surface area covered by the CMC outer portion. It is noted that the area defined by any inlet 126 and/or outlet 128 is not included in the surface area of the inner portion 120. The terms "substantially surrounds" and "substantially surrounding" may include completely surrounds (e.g., encases) and completely surrounding (e.g., encasing), respectively. The terms "encases" and "encasing" refer to completely surrounding the inner portion but for any fluid cavities or channels defined therein.

DETAILED DESCRIPTION OF PREFERRED EMBODIMENTS

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out, to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As described herein, the presently disclosed subject matter involves the use of additive manufacturing machines or systems. As used herein, the term "additive manufacturing"

refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, binder jet printing, and other additive manufacturing technologies that utilize an energy beam or other energy source to solidify an additive manufacturing material such as a powder material. In fact, any suitable additive manufacturing modality may be utilized with the presently disclosed subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer may be, for example, between about 10 µm and 200 µm, although the thickness may be determined based on any number of parameters and may be any suitable size.

Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

The present disclosure is generally related to additively printed inner portions for composite components for defining one or more passages, such as cooling channels, in the composite component. For instance, an additively printed inner portion for a composite component can define one or more passages, then the additively printed inner portion can be wrapped in or disposed within a composite material to form the composite component. The additively printed inner portion, with the one or more passages defined therein, may be formed from an additive manufacturing process or the like to define complex features or geometries that would be difficult or impossible to form in the composite component using conventional techniques, such as laser machining, electric discharge machining (EDM), etc. As one example, the present subject matter allows cooling features for improved cooling of airfoils, such as improved cooling of an airfoil trailing edge region by introducing passages that are closer to a trailing edge of the airfoil and increasing the heat transfer coefficient on a cold or suction side while avoiding performance penalties that arise from film cooling the suction side. Accordingly, the additively printed inner portions described herein can improve cooling of a composite component, e.g., by defining passages for a cooling fluid to provide targeted cooling of specific features or locations within or on the composite component and/or to increase the heat transfer coefficient at one or more locations of the composite component or otherwise allow more efficient heat transfer.

Referring now to the drawings, wherein identical numerals indicate the same elements throughout the figures, FIG. 1 is a schematic cross-sectional view of a gas turbine engine in accordance with an exemplary aspect of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a circumferential direction C (extending about the longitudinal centerline 12 and the axial direction A), and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a hub or disk 42 in a spaced apart manner. As depicted, fan blades 40 extend outward from disk 42 generally along the radial direction R. The fan blades 40 and disk 42 are together rotatable about the longitudinal centerline 12 by LP shaft or spool 36. In some embodiments, a power gear box having a plurality of gears may be included for stepping down the rotational speed of the LP shaft or spool 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52.

Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan engine 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the compressor section and into the combustion section 26, where it is mixed with fuel and burned to provide combustion gases 66. More particularly, the compressor section includes the LP compressor 22 and the HP compressor 24 that each may comprise a plurality of compressor stages 80, with each stage 80 including both an annular array or circumferential row of stationary compressor vanes 82 (also referred to as compressor stator vanes 82) and an annular array or circumferential row of rotating compressor blades 84 (also referred to as compressor rotor blades 84) positioned immediately downstream of the compressor stator vanes 82. The plurality of compressor rotor blades 84 in the LP compressor 22 are coupled to the LP shaft or spool 36, and the plurality of compressor blades in the HP compressor 24 are coupled to the HP shaft or spool 34. The plurality of compressor stator vanes 82 in the LP compressor 22 are coupled to a compressor casing, and the plurality of compressor stator vanes 82 in the HP compressor 24 are coupled to a compressor casing; at least a portion of the HP compressor stator vanes 82 are coupled to compressor casing 90. In some embodiments, the compressor casing 90 may extend through both the LP compressor 22 and the HP compressor 24 and support all of the compressor stator vanes 82. In other embodiments, the compressor casing 90 supports only a portion of the compressor stator vanes 82 and may support only a portion of the compressor stator vanes 82 in the HP compressor 24. As previously described, as the second portion of air 64 passes through the sequential stages of compressor stator vanes 82 and compressor rotor blades 84, the volume of air 64 is pressurized, i.e., the pressure of the air 64 is increased prior to combustion with fuel in the combustion section 26 to form the combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although the gas turbine engine of FIG. 1 is depicted in a turboshaft configuration, it will be appreciated that the teachings of the present disclosure can apply to other types of turbine engines, turbomachines more generally, and other shaft systems. For example, the turbine engine may be another suitable type of gas turbine engine, such as e.g., a turboprop, turbojet, turbofan, aeroderivatives, etc. The present disclosure may also apply to other types of turbomachinery, such as e.g., steam turbine engines. Further, the present disclosure may apply to other types of composite components, such as those used in applications other than turbomachinery.

Figure 2B:
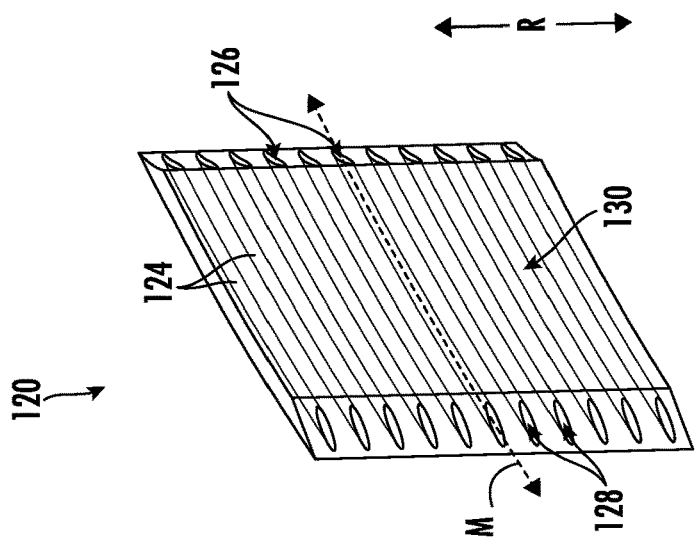
FIG. 2B is a perspective view of the additively printed inner portion of FIG. 2A.
Figure 2A:
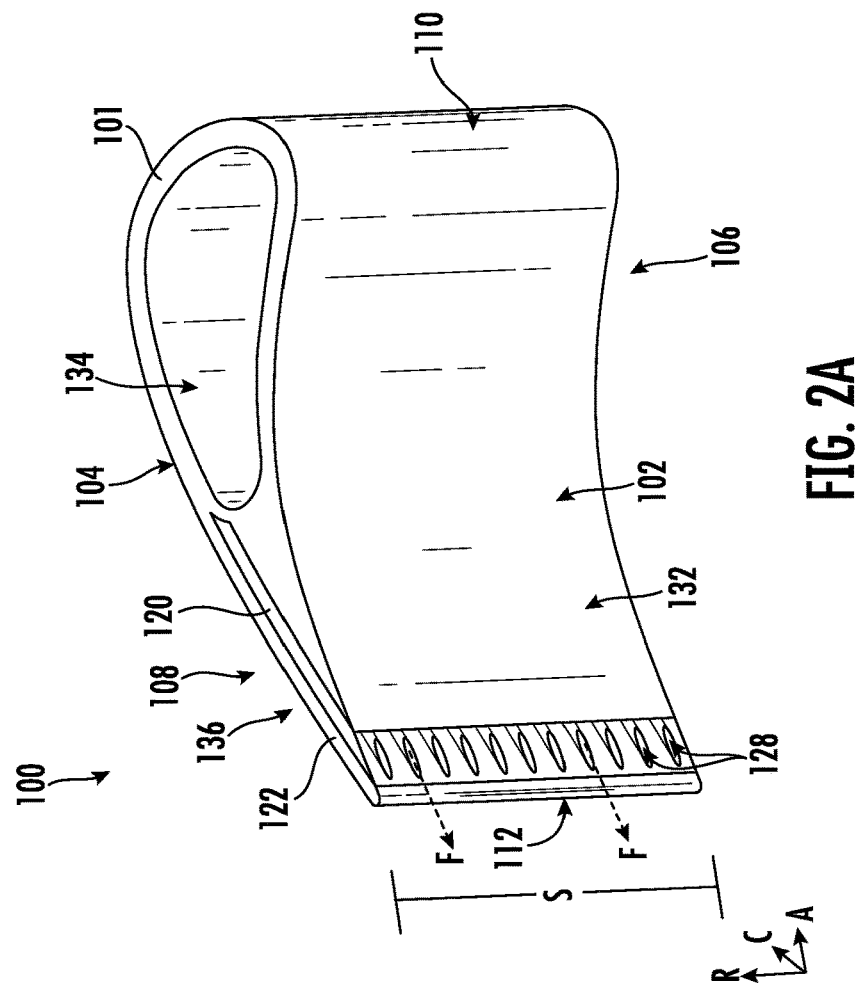
FIG. 2A is a perspective view of a composite airfoil having an additively printed inner portion in accordance with an exemplary aspect of the present disclosure.

FIG. 2A provides a perspective view of a composite component 100, shown as an airfoil, for a gas turbine engine such as turbofan engine 10 illustrated in FIG. 1. That is, for the embodiments described herein, the composite component 100 is formed from a composite material, e.g., a ceramic matrix composite (CMC) material.

As shown in FIG. 2A, the airfoil 101 includes a concave pressure side 102 opposite a convex suction side 104. The pressure side 102 is opposite the suction side 104, and the opposite pressure and suction sides 102, 104 of the airfoil 101 extend along a radial direction R over a span S from an inner end 106 to an outer end 108. The inner end 106 may be, e.g., a root of a blade airfoil, and the outer end 108 may be, e.g., a tip of a blade airfoil. The pressure side 102 and the suction side 104 of the airfoil 101 extend along an axial direction A between a leading edge 110 and a trailing edge 112, i.e., the trailing edge 112 is opposite the leading edge 110 along the axial direction A. The leading edge 110 defines a forward end of the airfoil 101, and the trailing edge 112 defines an aft end of the airfoil 101.

As shown in FIG. 2A, the composite component 100 includes an additively printed inner portion 120 and a CMC outer portion 122 substantially surrounding the additively printed inner portion 120. FIG. 2B provides a perspective view of the additively printed inner portion 120 shown in FIG. 2A. Referring to FIG. 2B, the additively printed inner portion 120 defines a plurality of cooling channels 124 (serving as a plurality of flowpath features 124), with each cooling channel 124 of the plurality of cooling channels 124 having an inlet 126 and an outlet 128. The additively printed inner portion 120 also has an outer surface 130.

Referring back to FIG. 2A, the CMC outer portion 122 substantially surrounds the additively printed inner portion 120 such that the CMC outer portion 122 is in contact with the outer surface 130. Further, the CMC outer portion 122 has a cover outer surface 132. In the embodiment shown in FIG. 2A, the outlet 128 of each cooling channel 124 extends to the cover outer surface 132, which defines an outer surface of the airfoil 101. That is, the outlet 128 of each cooling channel 124 is defined along the outer surface of the airfoil 101. However, in some embodiments, the outlet 128 of one or more of the cooling channels 124 may be defined at the cover outer surface 132, such that at least one, but not necessarily all, of the outlets 128 are defined at the cover outer surface 132.

As shown in FIG. 2A, in some embodiments, the airfoil 101 defines a cooling cavity 134 for receipt of a cooling fluid F, and the trailing edge 112 of the airfoil 101 is defined by a trailing edge region 136 positioned aft of the cooling cavity 134. The cooling cavity 134 may be defined by the CMC outer portion 122 or another portion of composite material. Further, the cooling cavity 134 may extend along the radial direction R over all or only a portion of the span S between the inner end 106 and the outer end 108. Moreover, although the cooling cavity 134 is shown in FIG. 2A (as well as other figures) as defined adjacent the leading edge 110, it will be appreciated that the cooling cavity 134 may be defined at any suitable location along the axial direction A between the leading edge 110 and the trailing edge 112.

In the embodiment of FIG. 2A, the additively printed inner portion 120 is disposed in the trailing edge region 136 and positioned adjacent the suction side 104 such that the additively printed inner portion 120 is closer to the suction side 104 than the pressure side 102. More generally, a midline M (FIG. 2B) of the additively printed inner portion 120 extending along the axial direction A may be closer to one of the pressure side 102 or the suction side 104 than the other of the pressure side 102 or the suction side 104.

Positioning the additively printed inner portion 120 closer to one side of the airfoil 101 than the other side of the airfoil 101 can allow tailored or targeted cooling of the airfoil 101. For instance, by disposing the additively printed inner portion 120 adjacent the suction side 104 as shown in FIG. 2A, the suction side 104 may be cooled through heat transfer with the cooling fluid F flowing the cooling channels 124 of the additively printed inner portion 120, which may eliminate the need for film cooling the suction side and thereby eliminate the performance penalty associated with such film cooling. Additionally, or alternatively, in some embodiments, the additively printed inner portion 120 may be positioned closer to the pressure side 102 than the suction side 104 to provide needed cooling axially along the pressure side 102.

Figure 3:
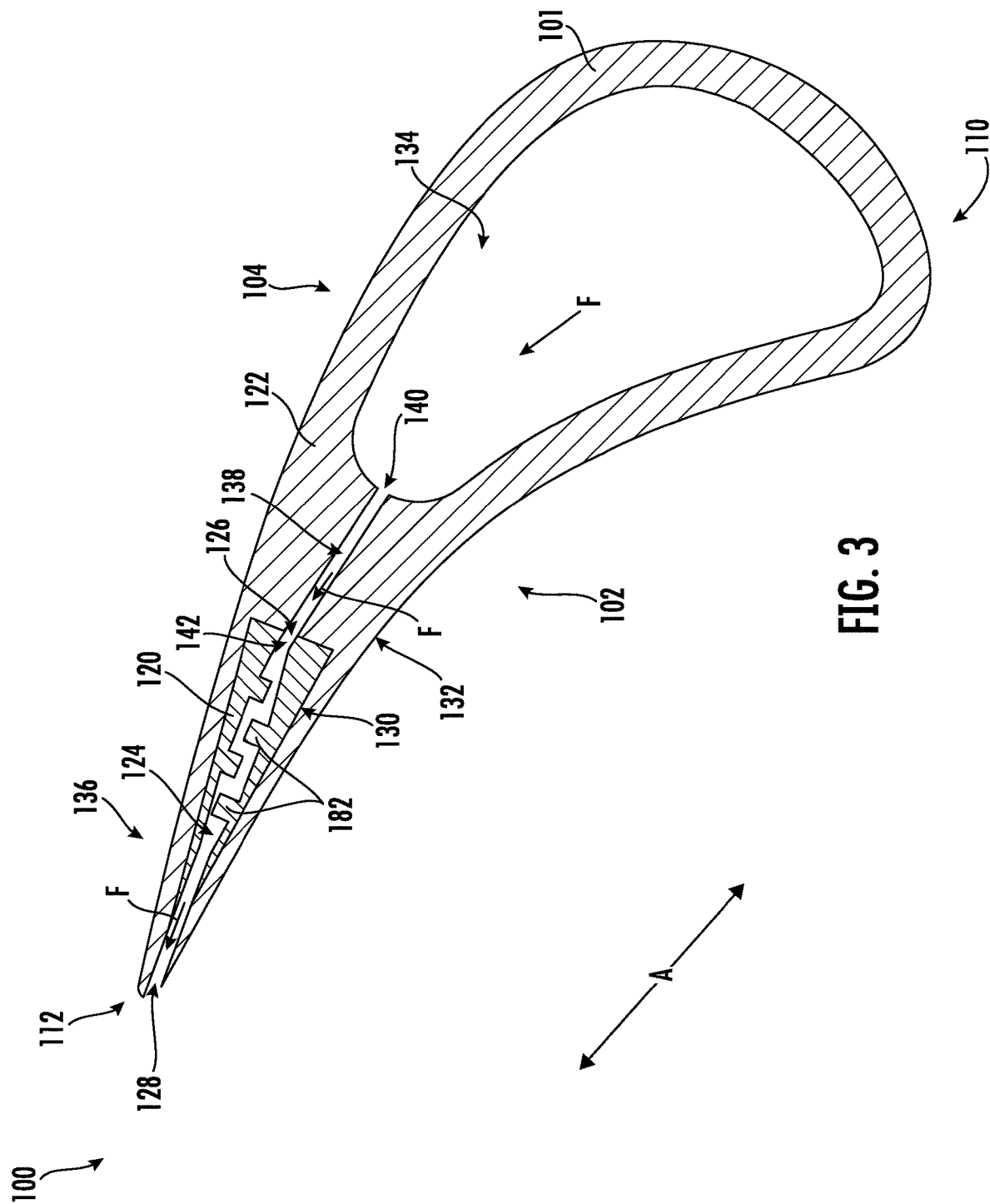
FIG. 3 is a schematic cross-sectional view of a composite airfoil having an additively printed inner portion positioned in a trailing edge region of the composite airfoil in accordance with an exemplary aspect of the present disclosure.

In some embodiments, such as shown in FIG. 2A, the inlet 126 of each cooling channel 124 may be fluidly coupled to the cooling cavity 134 of the component 100 such that, e.g., the cooling fluid F may flow from the cooling cavity 134 into the cooling channels 124, where the cooling fluid F exits a respective cooling channel 124 at the outlet 128 of the respective cooling channel 124. Referring to FIG. 3, in other embodiments, the additively printed inner portion 120 may be spaced apart from the cooling cavity 134, such that the inlet 126 of each cooling channel 124 is defined away from the cooling cavity 134, while remaining fluidly coupled together. In such embodiments, a feed channel 138 extends from the cooling cavity 134 to the inlet 126 of each cooling channel 124 of the plurality of cooling channels 124. As such, for an additively printed inner portion 120 defining a plurality of cooling channels 124, the airfoil 101 may define a corresponding plurality of feed channels 138, within a respective one feed channel 138 extending between the cooling cavity 134 and a respective one cooling channel 124 of the additively printed inner portion 120.

Each feed channel 138 includes a feed channel inlet 140 and a feed channel outlet 142. The feed channel inlet 140 is defined at the cooling cavity 134, and the feed channel outlet 142 is defined at a respective cooling channel 124. For example, the feed channel outlet 142 of a respective feed channel 138 may extend to the inlet 126 of a respective cooling channel 124. In this way, each feed channel 138 defines a passage or pathway for the cooling fluid F to flow from the cooling cavity 134 to the additively printed inner portion 120, e.g., to the cooling channels 124 of the additively printed inner portion 120 for the embodiment of FIG. 3. In the embodiment of FIG. 3, the inner portion 120 is encased within the CMC outer portion 122.

The one or more feed channels 138 may be defined using conventional techniques. For example, one or more feed channels 138 may be laser drilled; defined by electrical discharge machining (EDM); formed through the use of fugitive materials, which burn out or are otherwise removed during thermal and/or chemical processing of the composite material; or any other suitable technique or combination of techniques.

Figure 4:
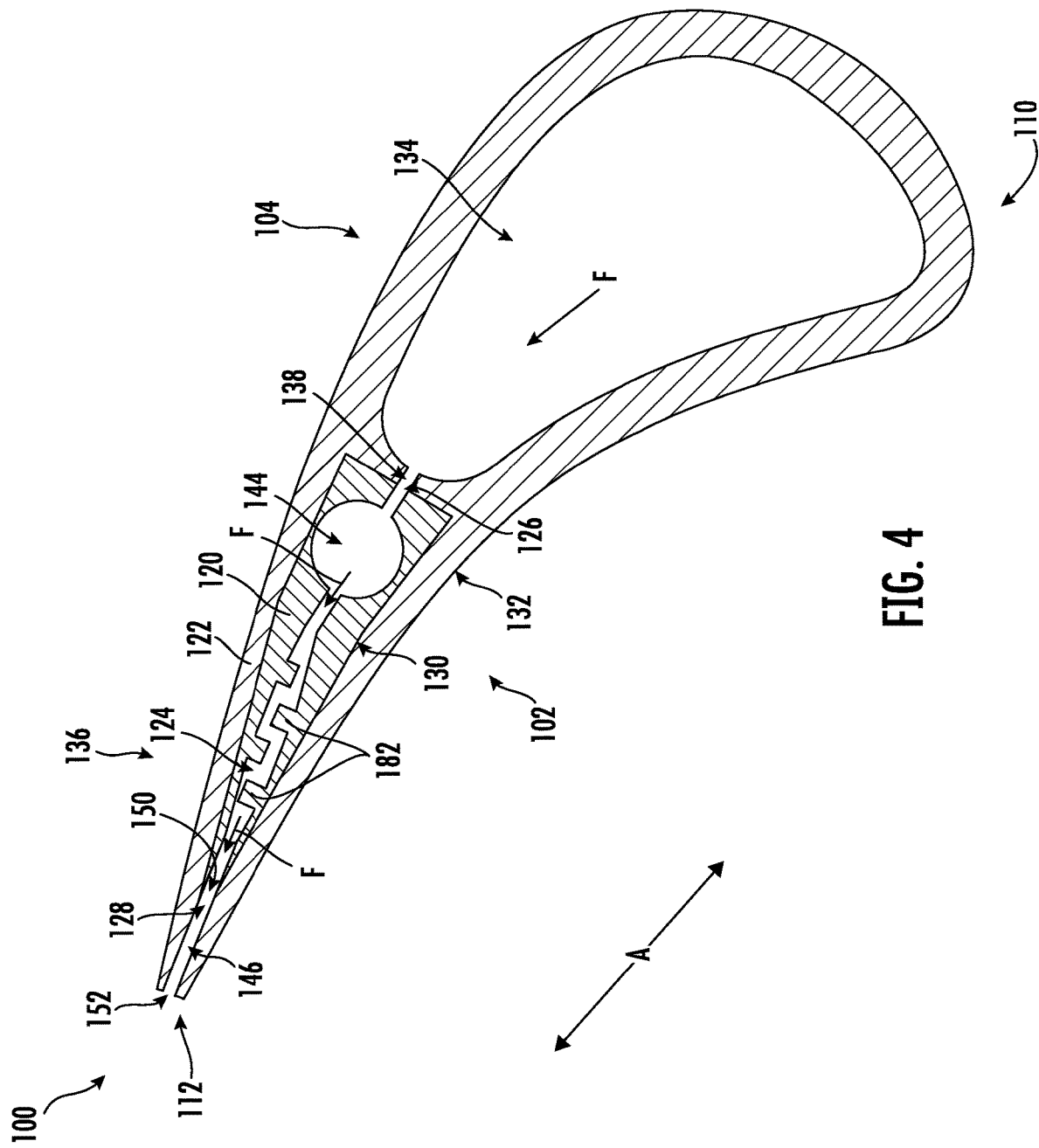
FIG. 4 is a schematic cross-sectional view of a composite airfoil having an additively printed inner portion defining an additively printed inner portion cavity in accordance with an exemplary aspect of the present disclosure.

Referring to FIG. 4, another embodiment of an additively printed inner portion 120 for a composite component such as an airfoil 101 is described, wherein the inner portion 120 is encased within the CMC outer portion 122. As shown in the schematic cross-sectional view of FIG. 4, the additively printed inner portion 120 may be positioned aft of the cooling cavity 134, and the additively printed inner portion 120 may define an additively printed inner portion cavity 144 that extends along at least a portion of the span S (FIG. 2A). That is, the additively printed inner portion 120 may define its own cooling cavity, additively printed inner portion cavity 144, for receipt of the cooling fluid F that extends along the radial direction R (FIG. 2A) over at least a portion of the span S between the inner end 106 and the outer end 108 of the airfoil 101.

As further illustrated in FIG. 4, at least one feed channel 138 extends from the cooling cavity 134 to the additively printed inner portion cavity 144. For example, for a respective feed channel 138, the feed channel inlet 140 is defined at the cooling cavity 134 and the feed channel outlet 142 is defined at the additively printed inner portion cavity 144. As such, the respective feed channel 138 defines a passage or pathway for the cooling fluid F to flow from the cooling cavity 134 to the additively printed inner portion 120, e.g., to the additively printed inner portion cavity 144 of the additively printed inner portion 120 for the embodiment of FIG. 4. As also illustrated in FIG. 4, the inlet 126 of a respective cooling channel 124 may be defined at the additively printed inner portion cavity 144 to allow the cooling fluid F to flow from the additively printed inner portion cavity 144 through the cooling channel 124 and be ejected from the airfoil 101 through the outlet 128 of the respective cooling channel 124.

Further, although the feed channel 138 depicted in FIG. 4 is defined at the same radial location as a respective cooling channel 124, it will be appreciated that the feed channel 138 need not be defined at the same radial location as any cooling channel 124 defined by the additively printed inner portion 120. For example, the number of feed channels 138 defined by the airfoil 101 may differ from the number of cooling channels 124 defined by the additively printed inner portion 120, such that not every feed channel 138 can be radially aligned with a respective cooling channel 124. For instance, a fewer number of feed channels 138 may be defined in the airfoil 101 than the number of cooling channels 124 defined in the additively printed inner portion 120, and one or more of the feed channels 138 may be defined at a different radial location than each cooling channel 124. As another example, it may be desirable to vary the shape or geometry of the fluid pathway through the airfoil 101, e.g., to optimize heat transfer between the cooling fluid and the composite component, and as such, the radial location of the feed channel(s) 138 may be different from the radial location of each cooling channel 124.

As described herein, and as most clearly shown in FIG. 2A, in at least some embodiments, the outlet 128 of one or more cooling channels 124 of an additively printed inner portion 120 may be defined at the outer surface of the composite component, such as at the cover outer surface 132. However, in some embodiments, the CMC outer portion 122 may overlie the outlet 128 of one or more cooling channels 124. Referring to FIG. 4, in such embodiments, an ejection channel 146 may be defined from the outer surface of the composite component, e.g., from the cover outer surface 132, to the outlet 128 of a respective cooling channel 124 to allow the cooling fluid F to be ejected from the respective cooling channel 124 to the external environment of the composite component. It will be appreciated that, although FIG. 4 depicts an ejection channel 146 extending from a cooling channel 124 to the cover outer surface 132, in other embodiments, one or more cooling channels 124 of an additively printed inner portion 120 having an additively printed inner portion cavity 144 as shown in FIG. 4 may extend to the cover outer surface 132 such that the outlet 128 of such cooling channels 124 is defined at the cover outer surface 132 as described with respect to FIG. 2A. Further, although not depicted in FIG. 4, one or more ejections channels 146 may be defined from the cover outer surface 132 to the additively printed inner portion cavity 144. For example, the cooling fluid F may be provided to the pressure side 102, the suction side 104, or both via one or more ejection channels 146 extending from the additively printed inner portion cavity 144 and/or cooling channel(s) 124 to the cover outer surface 132 at the pressure side 102, the suction side 104, or both.

Figure 5:
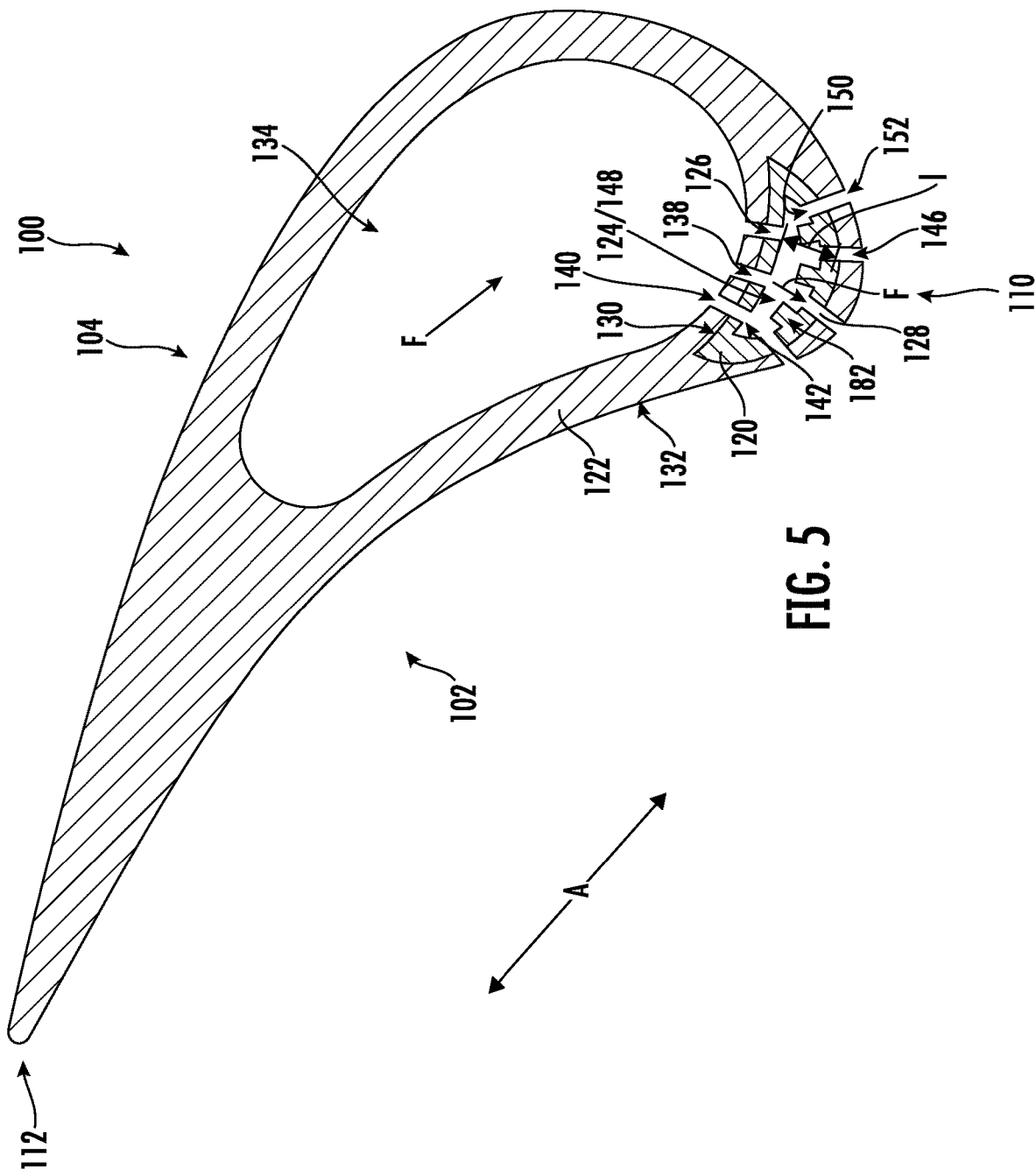
FIG. 5 is a schematic cross-sectional view of a composite airfoil having an additively printed inner portion positioned at or near a leading edge of the composite airfoil in accordance with an exemplary aspect of the present disclosure.
Figure 6:
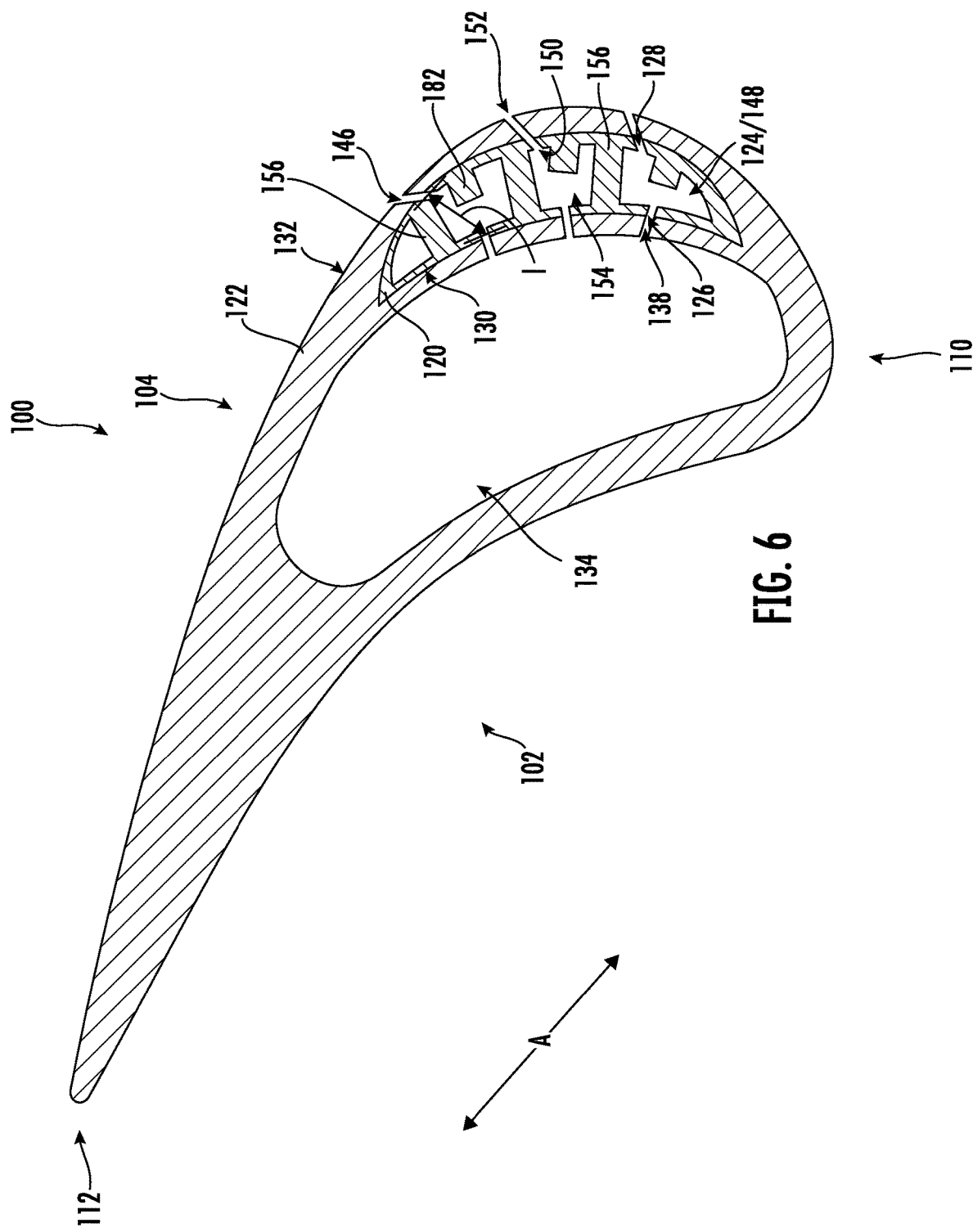
FIG. 6 is a schematic cross-sectional view of a composite airfoil having an additively printed inner portion defining an additively printed inner portion manifold divided into a plurality of chambers in accordance with an exemplary aspect of the present disclosure.
Figure 7:
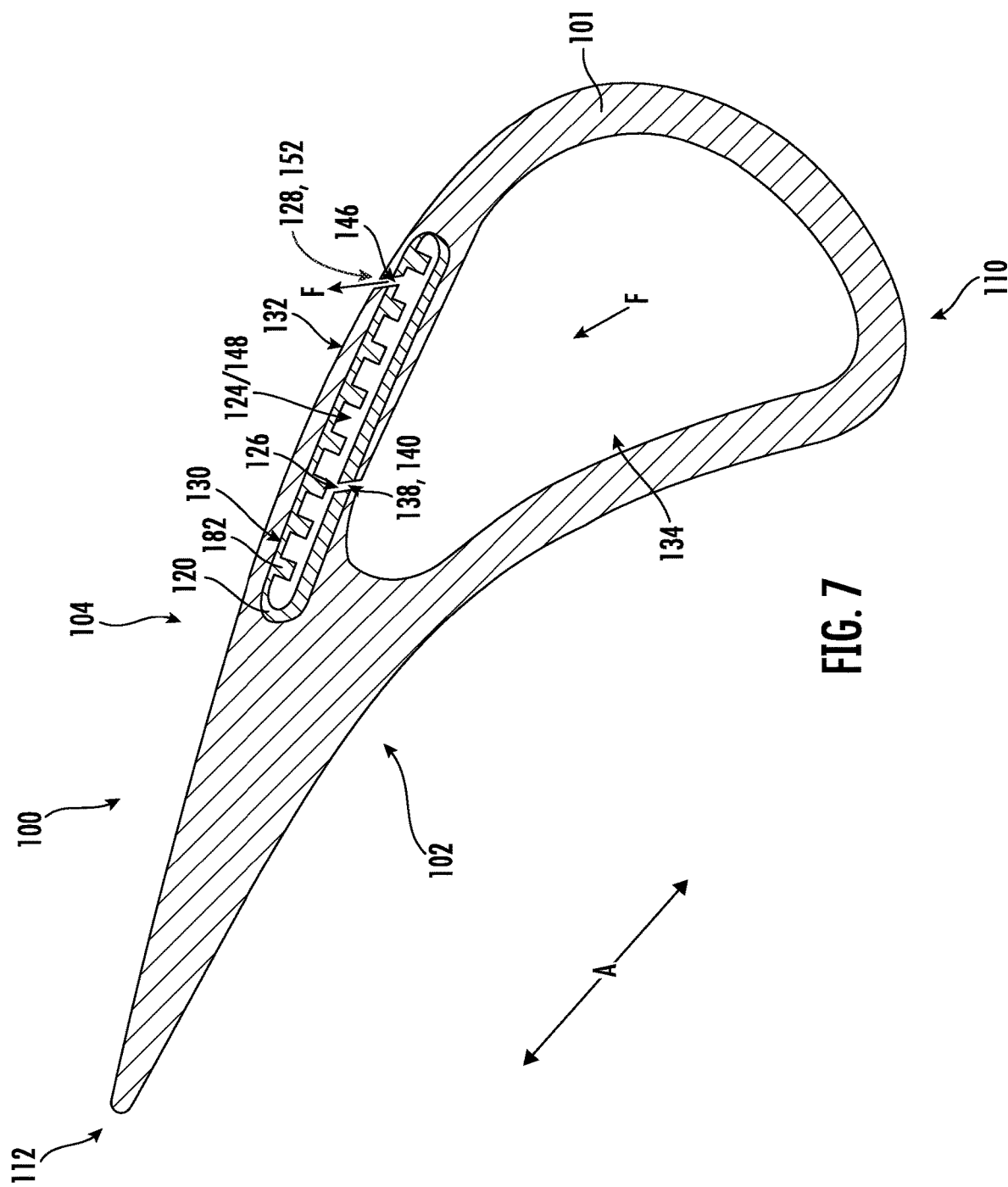
FIG. 7 is a schematic cross-sectional view of a composite airfoil having an additively printed inner portion disposed along a suction side of the composite airfoil in accordance with an exemplary aspect of the present disclosure.

In other embodiments, the additively printed inner portion 120 may be positioned in other locations of the airfoil 101, i.e., the additively printed inner portion 120 need not be located adjacent the trailing edge 112 (e.g., in a trailing edge region 136) of the airfoil 101. For example, referring to FIGS. 5 and 6, the additively printed inner portion 120 may be positioned adjacent the leading edge 110. As another example, referring to FIG. 7, the additively printed inner portion 120 may be positioned between the leading edge 110 and the trailing edge 112 along the axial direction A. For instance, the additively printed inner portion 120 may be positioned between the cooling cavity 134 and the additively printed inner portion cavity 144 along or adjacent the suction side 104 as shown in FIG. 7 or between the cooling cavity 134 and the additively printed inner portion cavity 144 along or adjacent the pressure side 102. In the embodiments of FIGS. 5, 6, and 7, the inner portion 120 is encased within the CMC outer portion 122.

Keeping with FIGS. 5, 6, and 7, in some embodiments, the cooling channel 124 may be configured as an additively printed inner portion manifold 148. For example, rather than a plurality of cooling channels 124 forming passages for the cooling fluid F to flow through the additively printed inner portion 120, e.g., from an inlet 126 to an outlet 128 of each cooling channel 124, the additively printed inner portion 120 may define an additively printed inner portion manifold 148. One or more feed channels 138 may deliver the cooling fluid F from the cooling cavity 134 to the additively printed inner portion manifold 148, and one or more ejection channels 146 may convey the cooling fluid F from the additively printed inner portion manifold 148 to the cover outer surface 132, or the environment external to the composite component (airfoil 101). Each feed channel 138 may extend from a feed channel inlet 140 defined at the cooling cavity 134 to a feed channel outlet 142 at the additively printed inner portion manifold 148. Each ejection channel 146 may extend from an ejection channel inlet 150 defined at the additively printed inner portion manifold 148 to an ejection channel outlet 152 defined at the cover outer surface 132.

The additively printed inner portion manifold 148 may extend along the radial direction R (FIG. 2A) over all or a portion of the span S (FIG. 2A). For example, the additively printed inner portion manifold 148 may have a depth that is perpendicular to a length/defined between an inlet 126 of a cooling channel 124 defined at a radial location and an outlet 128 of the cooling channel 124 defined at the same radial location, e.g., as shown in FIG. 5, which is a cross-section of an airfoil 101 taken along a plane at a location along the span S (FIG. 2A). In some embodiments, a plurality of feed channels 138 may be defined at two or more radial locations and/or a plurality of ejection channels 146 may be defined at two or more radial locations to deliver and/or convey the cooling fluid F to the additively printed inner portion manifold 148 and/or from the additively printed inner portion manifold 148 at different locations along the span S (FIG. 2A).

Referring particularly to FIG. 6, the additively printed inner portion manifold 148 may be divided into a plurality of chambers 154, with a rib 156 disposed between adjacent chambers 154 to separate the chambers 154. In some embodiments, the additively printed inner portion manifold 148 may be divided into two or more chambers 154 that each extend radially, i.e., like the additively printed inner portion manifold 148, each chamber 154 extends over all or a portion of the span S (FIG. 2A) such that each chamber 154 has a depth. In other embodiments, the additively printed inner portion manifold 148 may be divided into two or more chambers 154 that each extend generally along the axial A, i.e., a first chamber 154 may extend along the radial direction R over a first portion of the span S and a second chamber 154 may extend along the radial direction R over a second portion of the span S such that the first chamber 154 and the second chamber 154 are defined at different radial locations rather than different axial and/or circumferential locations.

Turning to FIG. 7, the ejection channels 146 may be separated from the feed channels 138, e.g., to optimize the thermal design. For instance, a non-linear path may be defined from a feed channel inlet 140 to an ejection channel outlet 152. As an example, in the embodiment of FIG. 7, a feed channel 138 is defined in an airfoil 101 to feed a cooling fluid F to the additively printed inner portion 120 and an ejection channel 146 is defined in the airfoil 101 to direct the cooling fluid F to a cover outer surface 132 of the airfoil 101, or to an environment external to the airfoil 101. The feed channel 138 and the ejection channel 146 of the airfoil 101 shown in FIG. 7 are defined at the same radial location, but the feed channel 138 and the ejection channel 146 are each defined at an angle with respect to the additively printed inner portion 120, as well as with respect to the axial direction A. As such, the cooling fluid F must flow along a non-linear path from the feed channel inlet 140 to the ejection channel outlet 152. For example, in the depicted embodiment, the cooling fluid F must flow generally aft to enter the additively printed inner portion 120 through the feed channel 138, then flow generally forward to exit the additively printed inner portion 120 through the ejection channel 146, and finally flow generally aft to exit the ejection channel 146 and reach the exterior of the airfoil 101.

The additively printed inner portions 120, feed channels 138, and ejection channels 146 shown in the embodiments of FIGS. 5 and 6 similarly illustrate non-linear pathways from the cooling cavity 134, through the additively printed inner portion 120, to the exterior of the airfoil 101, while the embodiments of FIGS. 2A, 2B, 3, and 4 illustrate generally linear pathways for the cooling fluid F to flow from the cooling cavity 134, through the additively printed inner portion 120, and to the exterior of the airfoil 101. The non-linear pathways depicted, e.g., in FIGS. 5 through 7, may increase heat transfer or otherwise provide more beneficial cooling compared to linear pathways through the depicted additively printed inner portions 120. However, linear pathways, such as shown, e.g., in FIGS. 2A through 4, may be desirable in some areas of the composite component to optimize cooling of such areas of the composite component.

Figure 8A:
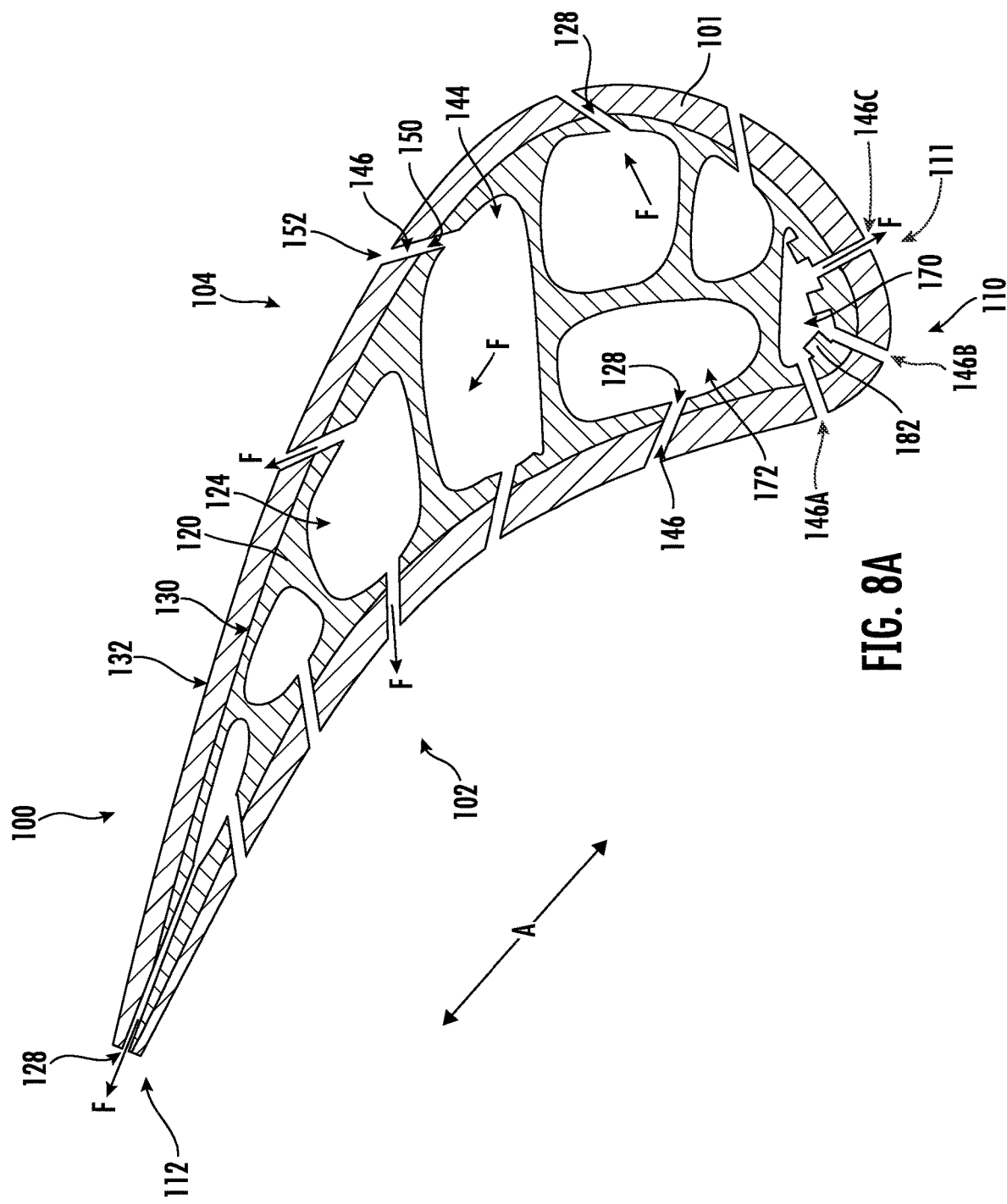
FIG. 8A is a schematic cross-sectional view of a composite airfoil having an additively printed inner portion defining a serpentine cavity in accordance with an exemplary aspect of the present disclosure.
Figure 8B:
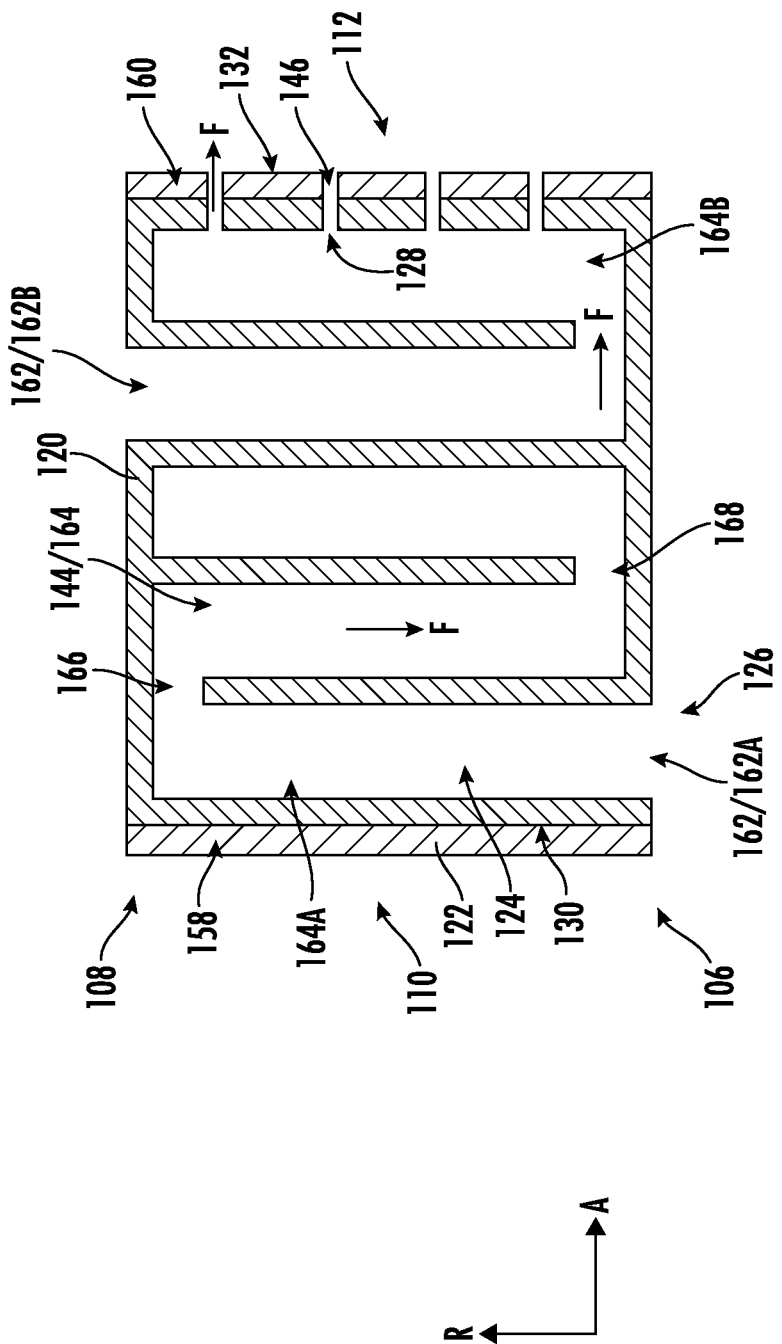
FIG. 8B is a schematic cross-sectional view of the composite airfoil of FIG. 8B, the cross-section taken along a radial direction.

Reference is now made to FIGS. 8A and 8B. FIG. 8A provides a cross-sectional view of a composite component 100 in a plane perpendicular to a spanwise direction (or radial direction R, see FIG. 8B), and FIG. 8B provides a cross-sectional view of the composite component 100 in a plane extending in the radial direction R and between a leading edge 110 and a trailing edge 112 (note that FIG. 8B is a schematic, plan view to depict certain aspects as discussed below). The composite component 100 of FIGS. 8A and 8B may be configured in a similar manner as one or more of the exemplary composite components described above.

Referring to FIGS. 8A and 8B, one or more ejection channels 146 may be defined in the additively printed inner portion cavity 144 for the flow of cooling fluid F from the additively printed inner portion 120 to a cover outer surface 132 of the airfoil 101. For example, as shown in FIG. 8A, a plurality of ejection channels 146 may be defined at a plurality of axial locations, e.g., from one or more portions of a respective serpentine pathway 164 (see schematic, plan view of FIG. 8B). In some embodiments, a plurality of ejection channels 146 may be defined to a particular portion of a serpentine pathway 164, such as a first ejection channel 146A, a second ejection channel 146B, and a third ejection channel 146C that are defined to the first portion 170 of the first serpentine pathway 164A, e.g., at or adjacent the leading edge 110, such as in a leading edge region 111. In some embodiments, a plurality of ejection channels 146 may also be defined to a particular portion of a serpentine pathway 164, such as a plurality of ejection channels 146 that are defined to the second portion 172 of the first serpentine pathway 164A. As a further example, referring to FIG. 8B, a plurality of ejection channels 146 may be defined at approximately the same axial location but at different radial locations, e.g., at or adjacent the trailing edge 112. It will be appreciated that, as described, e.g., with respect to FIG. 2B, in some embodiments the additively printed inner portion 120 may extend to the trailing edge 112 and define a plurality of outlets 128 such that the additively printed inner portion 120, rather than ejection channels 146, directs the cooling fluid F to the cover outer surface 132 and/or the external environment of the airfoil 101.

In one or more of the embodiments discussed hereinabove (e.g., one or more of the embodiments of FIGS. 2A through 8B), the additively printed inner portion 120 is formed from a first material and the CMC outer portion 122 is formed from a second material. However, in certain embodiments, one or more properties of the first material and the second material are substantially similar or the same. For example, the first material may be a monolithic ceramic material (i.e., fiber-free) and the second material may be a fiber-reinforced ceramic matrix composite (CMC) material, with the monolithic ceramic material being the same as or substantially similar to the ceramic matrix of the fiber-reinforced CMC material. That is, in various embodiments, the CMC outer portion 122 may be formed from a second material including fibers disposed in a ceramic matrix, and the additively printed inner portion 120 may be formed from a first material including the ceramic matrix. In certain embodiments, the ceramic matrix of the additively printed inner portion 120 may be different from the ceramic matrix of the CMC outer portion 122, i.e., the first material may differ from the second material with respect to more than fiber reinforcement, but in other embodiments, the ceramic matrix of the additively printed inner portion 120 may be the same as the ceramic matrix of the CMC outer portion 122. In any event, one or more properties of the first material, from which the additively printed inner portion 120 is formed, and the second material, from which the CMC outer portion 122 is formed, may be the same such that the additively printed inner portion 120 and CMC outer portion 122 are formed from compatible materials for bonding, thermal expansion, etc. That is, the first and second materials may be selected with one or more common properties to provide sufficient bonding between the additively printed inner portion 120 and the CMC outer portion 122, to avoid component failure due to a mismatch in coefficients of thermal expansion, etc.

The additively printed inner portion 120 may be formed by various methods. For example, the additively printed inner portion 120 may be a ceramic component, such as a silicon carbide (SiC) component, formed by an additive manufacturing process. In some embodiments, the additively printed inner portion 120 may be an additively formed SiC composite or an additively formed SiC monolith. In an example embodiment, the additively printed inner portion 120 is formed using an additive manufacturing process. For instance, the additively printed inner portion 120 includes a plurality of layers formed by depositing a layer of additive material on a bed of an additive manufacturing machine and selectively directing energy from an energy source onto the layer of additive material to fuse a portion of the additive material. By such an additive process, the additively printed inner portion may be an integrally formed component, such as a single monolithic component. Additive manufacturing is described in greater detail elsewhere herein.

Figure 9:
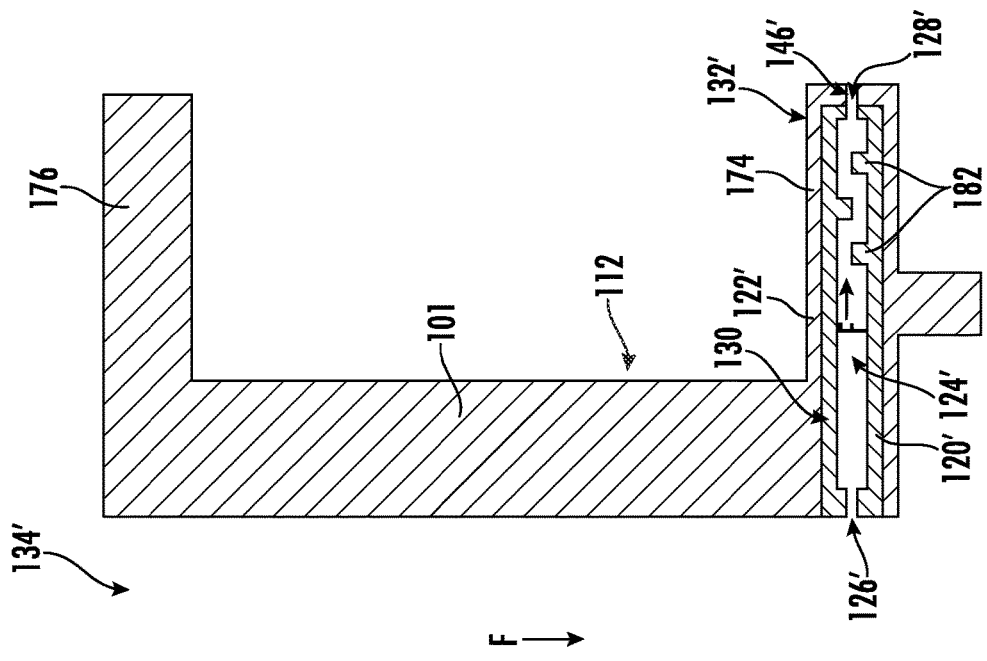
FIG. 9 is a schematic cross-sectional view of a composite nozzle airfoil assembly having an additively printed inner portion disposed in an inner band in accordance with an exemplary aspect of the present disclosure.
Figure 9:
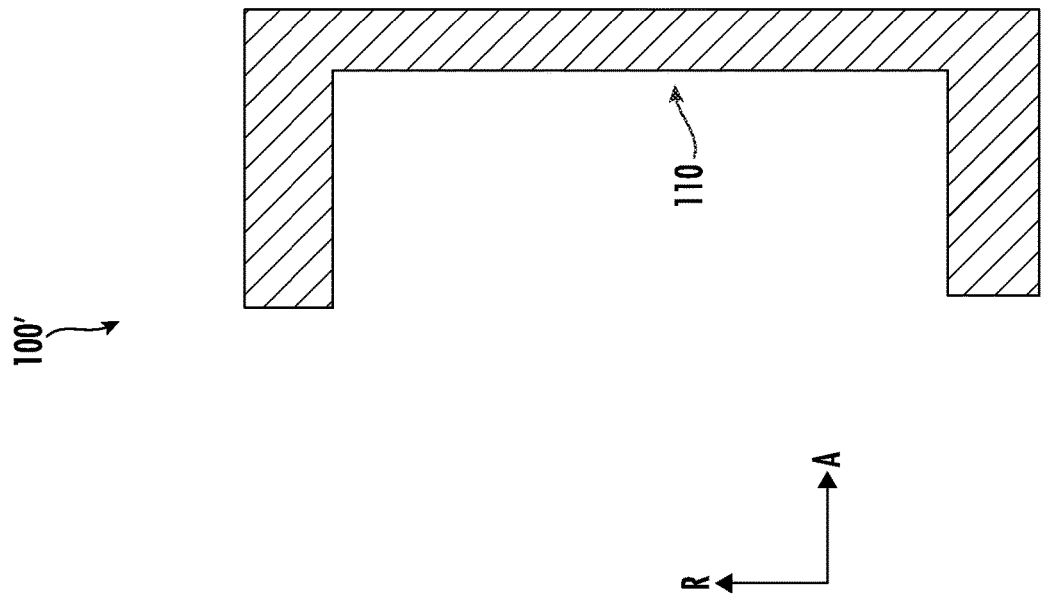
Figure 10:
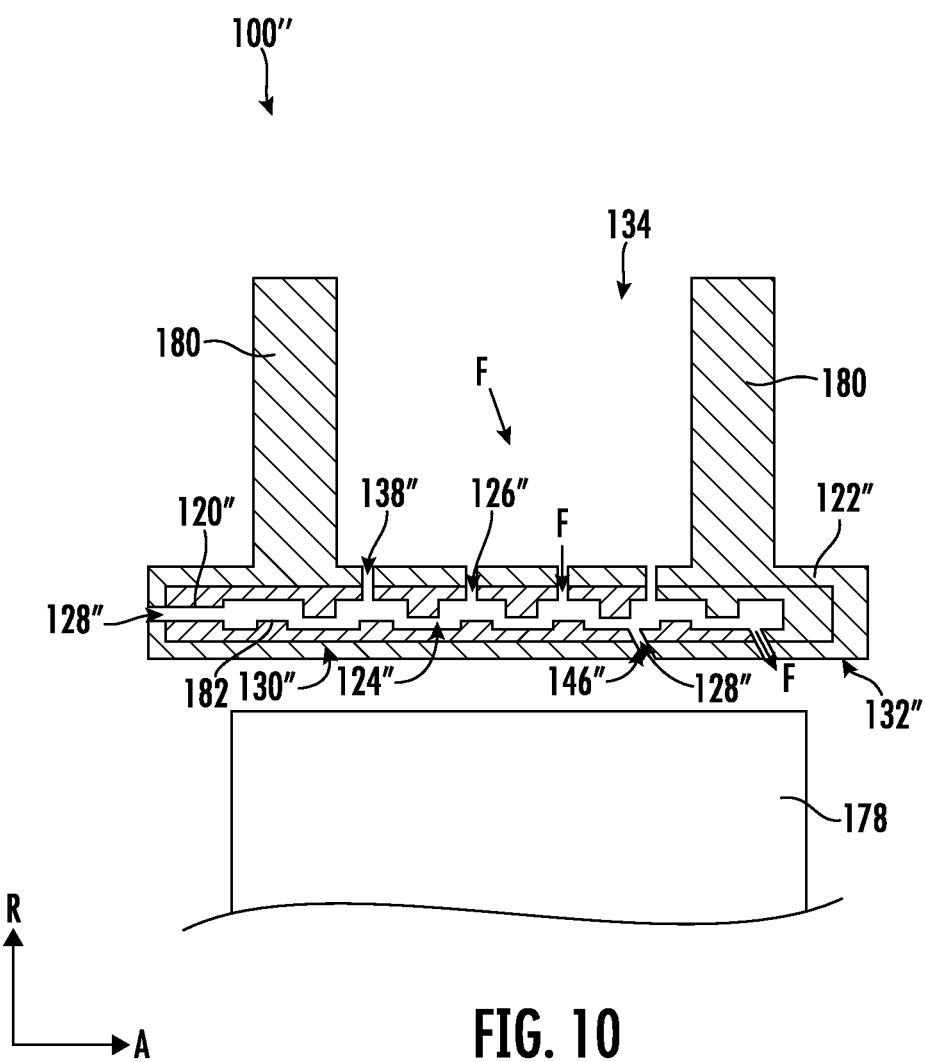
FIG. 10 is a schematic cross-sectional view of a composite shroud having an additively printed inner portion in accordance with an exemplary aspect of the present disclosure.

Turning now to FIGS. 9 and 10, views of composite components in accordance with two additional embodiment are provided, showing that the composite component need not be an airfoil such as shown in FIG. 2A but can be another composite component, such as another composite component of the turbofan engine 10 (FIG. 1).

Referring first to FIG. 9, a schematic view of a composite component is depicted. For example, in some embodiments, the composite component may be a nozzle airfoil assembly 100' having at least one of an inner band 174 or an outer band 176. It will be appreciated that the nozzle airfoil assembly 100' may also include an airfoil 101 extending from the at least one of the inner band 174 or the outer band 176, and the airfoil 101 may be configured as described elsewhere herein.

Keeping with FIG. 9, the nozzle airfoil assembly 100' further includes an additively printed inner portion 120' disposed in the at least one of the inner band 174 or the outer band 176. In the embodiment of FIG. 9, the additively printed inner portion 120' is disposed in the inner band 174; in other embodiments, the additively printed inner portion 120' may be disposed in the outer band 176, or a first additively printed inner portion 120' may be disposed in the inner band 174 and a second additively printed inner portion 120' may be disposed in the outer band 176. The additively printed inner portion 120' defines a cooling channel 124' having an inlet 126' and an outlet 128'. Further, the nozzle airfoil assembly 100' defines a cooling cavity 134', and a CMC outer portion 122' defining a cover outer surface 132' surrounding (encasing) the additively printed inner portion 120'. In FIG. 9, the additively printed inner portion 120' is disposed in an aft portion of the inner band 174, e.g., generally adjacent a trailing edge 112 of the airfoil 101 extending between the illustrated inner band 174 and outer band 176 of the nozzle airfoil assembly 100'. In other embodiments, the additively printed inner portion 120' may be disposed in another region of the inner band 174 (e.g., in a forward portion adjacent the leading edge 110 of the airfoil 101), or in a forward or aft portion of the outer band 176.

In the depicted embodiment, the inlet 126' of the cooling channel 124' is defined at the cooling cavity 134' and an ejection channel 146' is defined from an ejection channel inlet 150' and the outlet 128' of the cooling channel 124' to an ejection channel outlet 152' at the cover outer surface 132'. In other embodiments, the inlet 126' of the cooling channel 124' may be defined at the cooling cavity 134' and the outlet 128' may be defined at the cover outer surface 132'. In still other embodiments, a feed channel (not shown), such as described above, may be defined from a feed channel inlet at the cooling cavity 134' to a feed channel outlet at the inlet 126' of the cooling channel 124', and an ejection channel 146' may be defined from the outlet 128' of the cooling channel 124' to the cover outer surface 132' or the outlet 128' may be defined at the cover outer surface 132'.

It will be appreciated that other variations and configurations of the additively printed inner portion 120 as described herein may be applied to the additively printed inner portion 120' such that the additively printed inner portion 120' may be configured as described with respect to additively printed inner portion 120. For example, the cooling channel 124' of the additively printed inner portion 120' may be configured as an additively printed inner portion manifold, such as described with respect to additively printed inner portion manifold 148 in FIGS. 5 through 7. As another example, the additively printed inner portion 120' may be configured with one or more serpentine pathways, such as described with respect to serpentine pathways 164 in FIGS. 8A and 8B

Referring to FIG. 10, a schematic view is provided of another composite component 100". In the embodiment depicted, the composite component 100 may be a shroud 100". For instance, the shroud 100" may be positioned radially adjacent a plurality of blades 178, such as the HP turbine rotor blades 70 or the LP turbine rotor blades 74 of the turbofan engine 10 of FIG. 1. Like the airfoil 101 and the nozzle airfoil assembly 100', the shroud 100" includes an additively printed inner portion 120" having an outer surface 130" and defining at least one cooling channel 124" that has an inlet 126" and an outlet 128". The shroud 100" further includes a CMC outer portion 122" having a cover outer surface 132" and surrounding the additively printed inner portion 120" such that the CMC outer portion 122" is in contact with the outer surface 130".

As shown in FIG. 10, the additively printed inner portion 120" is disposed in a portion of the shroud 100" closest to the plurality of blades 178. In other embodiments, the 120" may be positioned in other regions of the shroud 100", such as in a radially extending portion 180, which may be used to attach the shroud 100" to a shroud hanger assembly. Further, although depicted in FIG. 10 as an open shroud 100", it will be appreciated that the subject matter described herein may also be applied to box shrouds or other shroud configurations.

As described elsewhere herein, the shroud 100" may define a cooling cavity 134", which receives a cooling fluid F. One or more feed channels 138" may be defined from the cooling cavity 134" to the additively printed inner portion 120" to feed the cooling fluid F to the cooling channel 124". Additionally, or alternatively, the additively printed inner portion 120" may be positioned within the shroud 100" and the CMC outer portion 122" such that the inlet 126" of the cooling channel 124", or the inlet 126" of one or more cooling channels 124" for an additively printed inner portion 120" defining a plurality of cooling channels 124", is defined at the cooling cavity 134". Further, one or more ejection channels 146" may be defined from the cooling channel 124" to the cover outer surface 132" to direct the cooling fluid F from the additively printed inner portion 120" to the external environment of the shroud 100", e.g., to provide cooling adjacent an aft portion of the blades 178. Additionally, or alternatively, the additively printed inner portion 120" may be positioned within the shroud 100" and the CMC outer portion 122" such that the outlet 128" of the cooling channel 124", or the outlet 128" of one or more cooling channels 124" for an additively printed inner portion 120" defining a plurality of cooling channels 124", is defined at the cover outer surface 132".

As with the nozzle airfoil assembly 100', it will be appreciated that other variations and configurations of the additively printed inner portion 120 as described herein may be applied to the additively printed inner portion 120" such that the additively printed inner portion 120" may be configured as described with respect to additively printed inner portion 120. For example, the cooling channel 124" of the additively printed inner portion 120" may be configured as an additively printed inner portion manifold, such as described with respect to additively printed inner portion manifold 148 in FIGS. 5 through 7. As another example, the additively printed inner portion 120" may be configured with one or more serpentine pathways, such as described with respect to serpentine pathways 164 in FIGS. 8A and 8B.

As shown in various figures, in at least some embodiments, the additively printed inner portion 120 includes a plurality of heat transfer elements 182 extending into the at least one cooling channel 124. For example, referring to FIG. 3, the additively printed inner portion 120 includes a plurality of heat transfer elements 182 extending into the depicted cooling channel 124, and referring to FIG. 7, the additively printed inner portion 120 includes a plurality of heat transfer elements 182 extending into the illustrated additively printed inner portion manifold 148. Similarly, the additively printed inner portion 120' shown in FIG. 9 includes a plurality of heat transfer elements 182' extending into the depicted cooling channel 124', and in FIG. 10, the additively printed inner portion 120" includes a plurality of heat transfer elements 182" extending into the cooling channel 124". The heat transfer elements 182 may, e.g., increase heat transfer with a cooling fluid F flowing through the respective cooling channel 124 or additively printed inner portion manifold 148. The heat transfer elements 182 may be configured as pins, fins, turbulators, etc.

Figure 11A:
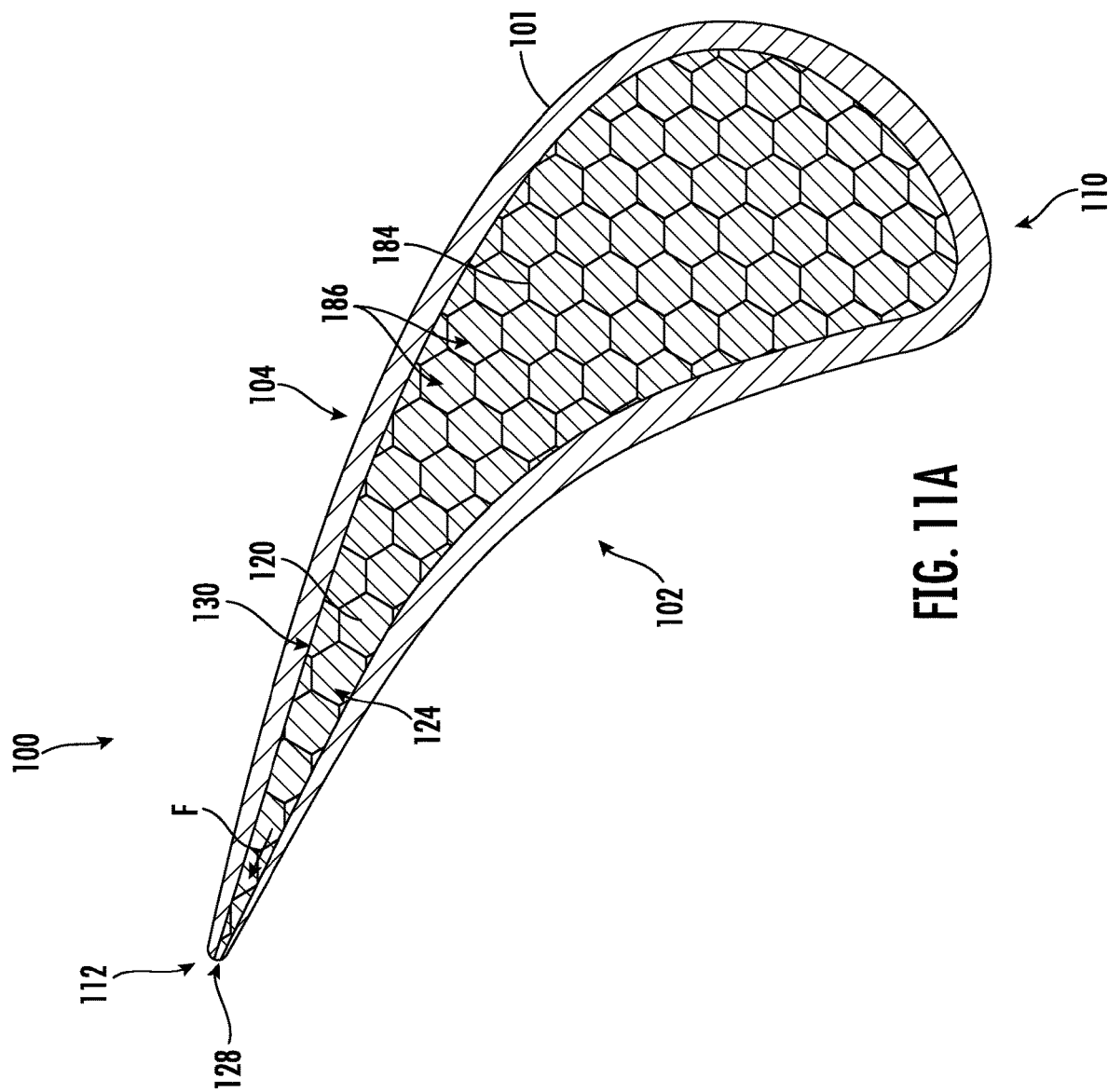
FIG. 11A is a schematic cross-sectional view of a composite airfoil having an additively printed inner portion defining a cell structure in accordance with an exemplary aspect of the present disclosure.
Figure 11B:
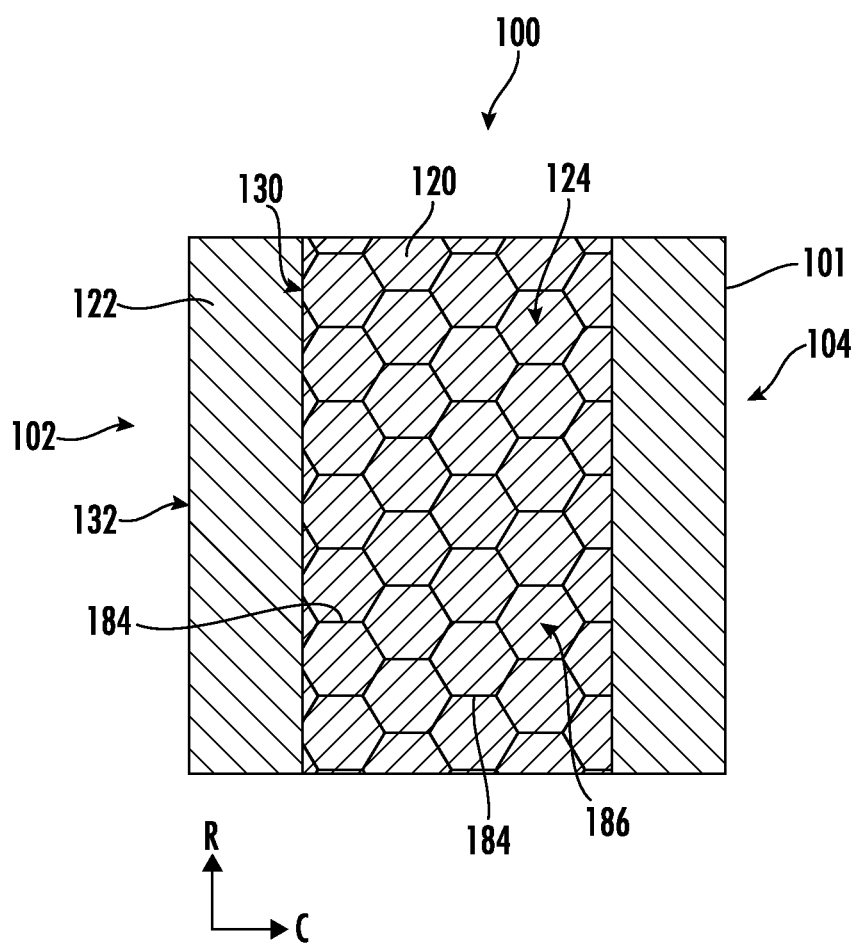
FIG. 11B is a schematic cross-sectional view of the composite airfoil of FIG. 11A, the cross-section taken along a radial direction.

Turning to FIGS. 11A and 11B, in some embodiments, an additively printed inner portion 120, 120', 120" may be configured with a cell structure 184, such as a honeycomb cell structure. The cell structure 184 can provide heat exchange, e.g., between a cooling fluid F flowing through the additively printed inner portion 120 and the composite component (airfoil 101 in the embodiment of FIGS. 11A and 11B), while also structurally reinforcing the composite component. For instance, the orientation of the cell structure 184 within the composite component can be used to directionally reinforce a strength of the composite component, e.g., based on component loads. The orientation of the cell structure 184 may be different for different composite components, e.g., nozzle airfoils and blades may have directional strength differences, or for composite components at different locations, e.g., nozzle airfoils immediately downstream of the combustion section 26 (FIG. 1) may have directional strength differences compared to nozzle airfoils disposed in the LP turbine 30 (FIG. 1). Cells 186 of the cell structure 184 may be oriented radially, axially, vertically, horizontally, or any orientation in a two-dimensional pattern or three-dimensional pattern. Further, in some embodiments, the cells 186 may be closed and isolated from one another, and in alternative embodiments, the cells 186 may be open and connected to one another. In still other embodiments, the cell structure 184 may be a hybrid of open, connected cells 186 and closed, isolated cells 186, e.g., in one portion of the cell structure 184, the cells 186 are open and connected to one another, and in another portion of the cell structure 184, the cells 186 are closed and isolated from one another.

Figure 12:
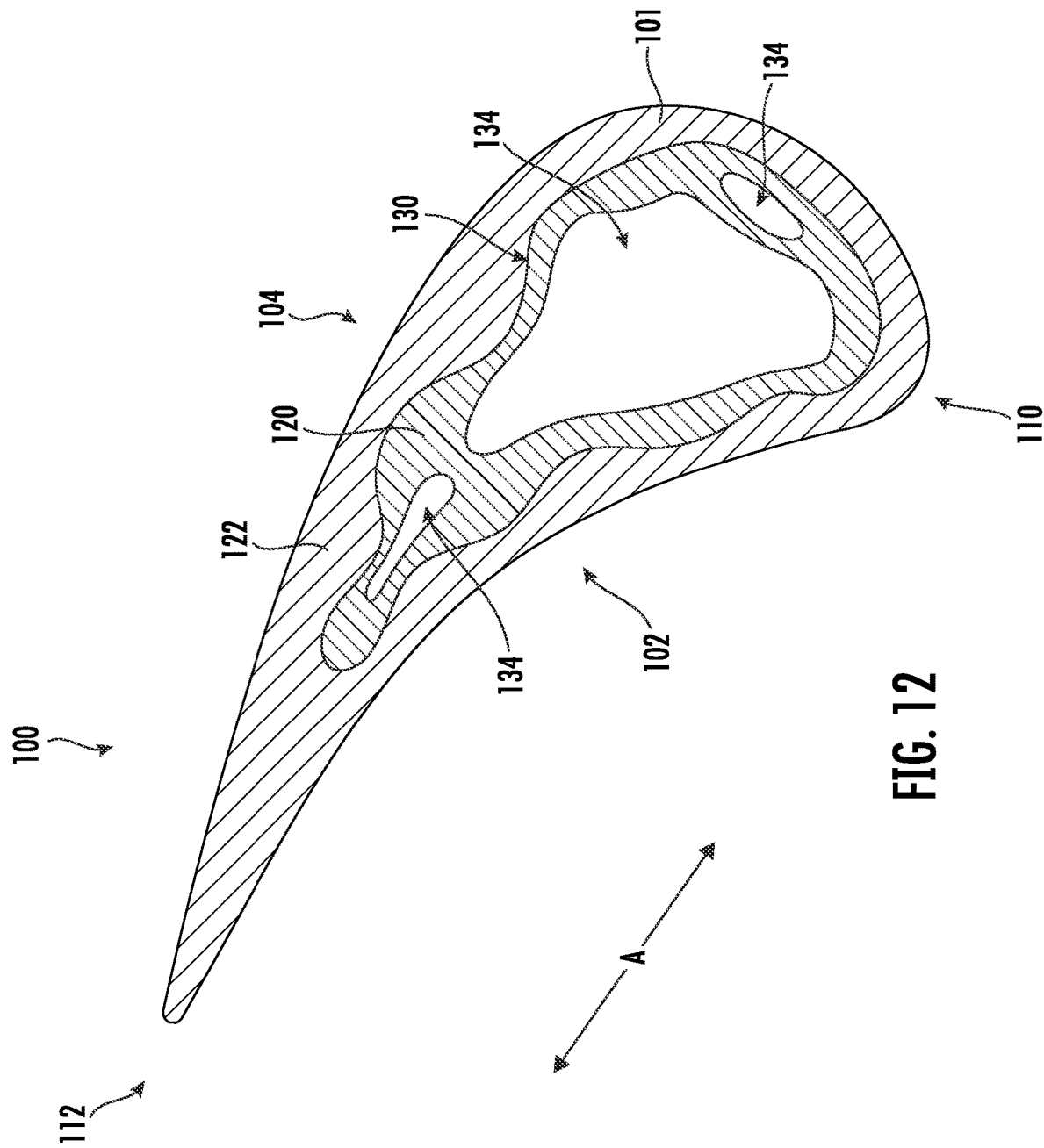
FIG. 12 is a schematic cross-sectional view of a composite shroud having an additively printed inner portion that served as a mandrel in accordance with an exemplary aspect of the present disclosure.

Referring to FIG. 12, an additively printed inner portion 120 may be utilized as a mandrel during the manufacturing process of the resulting composite component 100, which is then retained within the part upon formation. The additively printed inner portion 120 allows for complex mandrel shapes to be utilized. As such, non-line of sign mandrels can be utilized without subsequent extraction from the part after consolidation of the resulting composite component 100. Additionally, multiple cooling cavities 134 may be defined within the additively printed inner portion 120.

The outer surface 130 of the additively printed inner portion 120 generally serves as the mandrel for formation of the CMC outer portion 122. For example, one or more composite plies may be wrapped around the additively printed inner portion 120, to substantially surround or completely surround, to form the CMC outer portion 122. Although shown as including a single additively printed inner portion 120 as the mandrel, it is to be understood that any number of additively printed inner portions 120 may be included.

Figure 13:
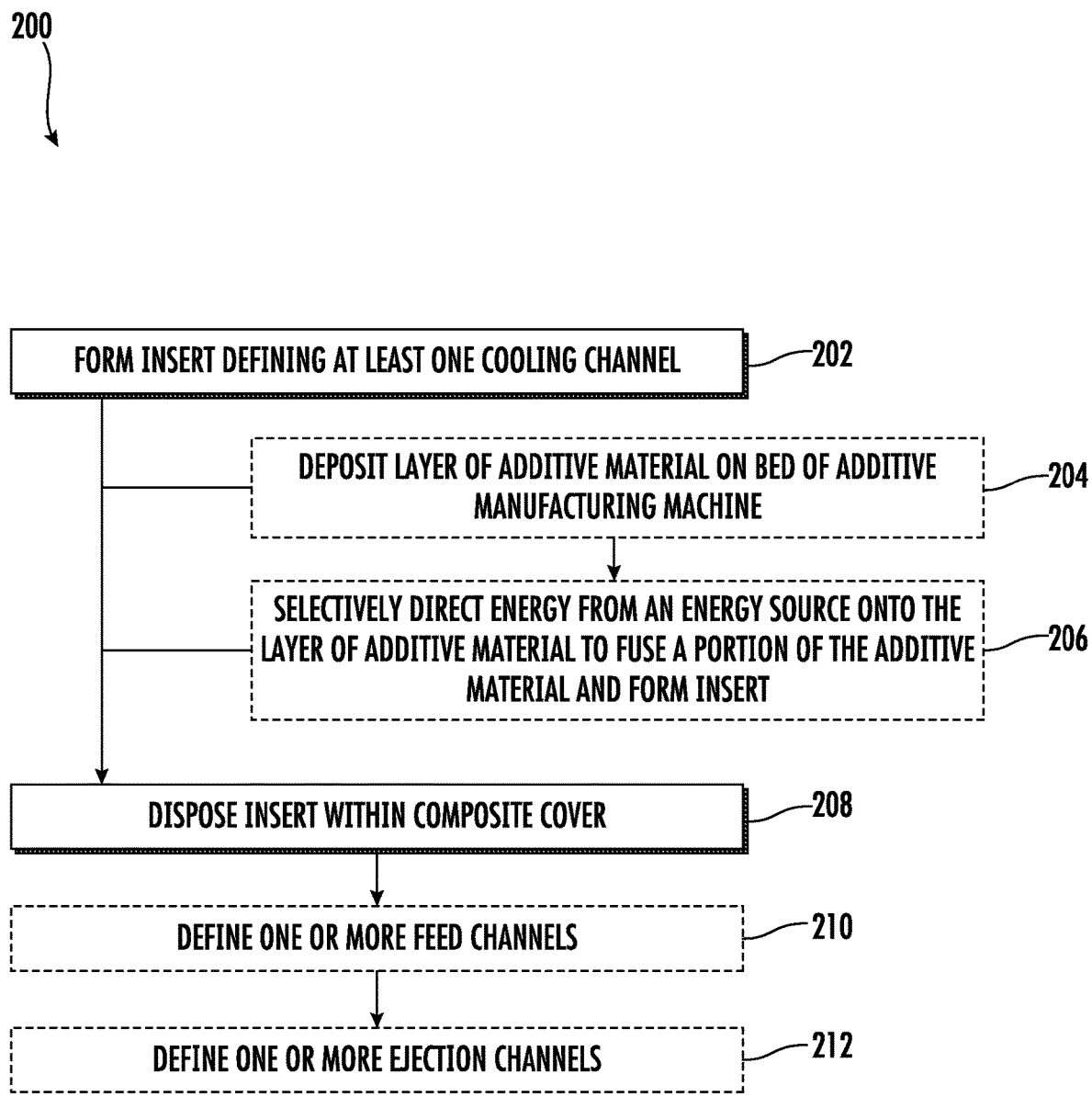
FIG. 13 is a flow diagram illustrating a method for forming a composite component in accordance with an exemplary aspect of the present disclosure.

Referring now to FIG. 13, a flow diagram of a method 200 for forming a composite component in accordance with an exemplary aspect of the present disclosure is provided. The method 200 of FIG. 13 may be utilized to form one or more of the exemplary composite components, such as the airfoils 100, nozzle airfoil assemblies 100', and shrouds 100", described above with reference to FIGS. 2A through 11B. Accordingly, it will be appreciated that the method 200 may generally be utilized to form a composite component including an additively printed inner portion surrounded by a CMC outer portion. However, in other exemplary aspects, the method 200 may additionally or alternatively be utilized to form any other suitable composite component.

As depicted, the method 200 includes at 202 forming an insert (e.g., an additively printed inner portion) that defines at least one cooling channel having an inlet and an outlet. As described herein, the insert may be formed by an additive manufacturing process, although in some embodiments, other processes may be used as well. For an additively printed inner portion formed by additive manufacturing, the method 200 further includes at 204 depositing a layer of additive material on a bed of an additive manufacturing machine and at 206 selectively directing energy from an energy source onto the layer of additive material to fuse a portion of the additive material and form an additively printed inner portion. By utilizing such an additive manufacturing process, the additively printed inner portion can be formed with one or more cooling channels as described herein, with the one or more cooling channels having any desired location, shape, size, feature, etc. For example, a plurality of heat transfer elements, such as pins, fins, turbulators, or the like, may be formed in one or more cooling channels as the layers of additive material are deposited on the bed of the additive manufacturing machine such that, when the additive material is fused as described herein, the additively printed inner portion includes at least one cooling channel having a plurality of heat transfer elements formed therein.

Keeping with FIG. 13, the method 200 also includes at 208 disposing the insert within a CMC outer portion having a cover outer surface. For instance, one or more composite plies may be wrapped around the additively printed inner portion to form the CMC outer portion, or the CMC outer portion may be a composite preform into which the additively printed inner portion is additively printed inner portioned or positioned. Then, the CMC outer portion may be formed by chemical vapor infiltration (CVI), melt infiltration (MI), polymer impregnation and pyrolysis (PIP) of the preform or the plurality of plies (e.g., with silicon) surrounding the inner portion.

As described herein, the CMC outer portion substantially surrounds the insert such that the CMC outer portion is in contact with the outer surface. As also described herein, the composite component, e.g., the CMC outer portion, may define a cooling cavity for the receipt of a cooling fluid. In some embodiments, the insert may be disposed within the CMC outer portion such that the inlet of the at least one cooling channel is disposed at the cooling cavity for the cooling fluid to flow from the cooling cavity into the at least one cooling channel. In other embodiments, the CMC outer portion or other material of the composite component is disposed between the insert and the cooling cavity, and the method 200 optionally includes at 210 defining one or more feed channels from the cooling cavity to the at least one cooling channel to provide a passage for cooling fluid to flow into the at least one cooling channel from the cooling cavity. The one or more feed channels may be defined by laser drilling, electric discharge machining (EDM), or any other suitable process for forming a passage from the cooling cavity to the additively printed inner portion.

Further, in some embodiments, the insert may be disposed within the CMC outer portion such that the outlet of the at least one cooling channel extends to the cover outer surface. In other embodiments, the CMC outer portion or other material of the composite component is positioned over the outlet of the at least one cooling channel, or between the insert at the cover outer surface, and the method 200 optionally includes at 212 defining one or more ejection channels from the cover outer surface to the at least one cooling channel of the insert to provide a passage for cooling fluid flowing into the at least one cooling channel to exit the cooling channel and exit the composite component at the cover outer surface. The one or more ejection channels may be defined by laser drilling, EDM, or any other suitable process for forming a passage from the cover outer surface to the insert.

Although the various composite components 100, 100', 100" described and illustrated herein incorporate an insert (e.g., single additively printed inner portion 120, 120', 120"), respectively, it will be appreciated that, in some embodiments, a composite component 100, 100', 100" may include a plurality of inserts (e.g., additively printed inner portions 120, 120', 120"). For example, where the composite component is an airfoil 101, the airfoil 101 may include a first additively printed inner portion 120 in a trailing edge region 136 of the airfoil 101 and a second additively printed inner portion 120 positioned near a leading edge 110 of the airfoil 101. Thus, a composite component 100, 100', 100" may include one, two, three, or more separate additively printed inner portions 120, 120', 120". Each additively printed inner portion 120, 120', 120" may be positioned in the respective composite component 100, 100', 100" at or near a location where cooling would be desirable.

Further aspects are provided by the subject matter of the following clauses:

A composite component for a gas turbine engine, the composite component comprising: an additively printed inner portion defining at least one flowpath feature, wherein the additively printed inner portion comprises SiC; a ceramic matrix composite (CMC) outer portion formed on the additively printed inner portion such that the CMC outer portion substantially surrounds the additively printed inner portion, wherein the CMC outer portion comprises a fiber-reinforced ceramic matrix and defines at least one cooling cavity fluidly coupled to the at least one flowpath feature of the additively printed inner portion, wherein the fiber-reinforced ceramic matrix comprises SiC.

The composite component of any preceding clause, wherein the at least one flowpath feature of the additively printed inner portion has a non-linear geometry.

The composite component of any preceding clause, wherein the CMC outer portion defines a linear channel fluidly coupling the at least one flowpath feature and the at least one cooling cavity.

The composite component of any preceding clause, wherein the CMC outer portion defines a hollow airfoil having a cooling cavity therein, and wherein the at least one flowpath feature extends non-linearly from the cooling cavity to an exterior surface of the hollow airfoil.

The composite component of any preceding clause, wherein the hollow airfoil has a pressure side opposite a suction side and a leading edge opposite a trailing edge, the pressure side and the suction side extending along an axial direction between the leading edge and the trailing edge with a non-linear, curved geometry and extending along a radial direction over a span, wherein the cooling cavity is positioned adjacent the leading edge, and wherein at least one first flowpath feature includes a plurality of cooling passages spaced along the span, each extending adjacent the suction side from an inlet in the cooling cavity to an outlet at the trailing edge with a non-linear, curved geometry along the axial direction conforming to the non-linear, curved geometry of the suction side.

The composite component of any preceding clause, wherein the at least one first flowpath feature is a cooling channel having a primary flow direction and an interior surface defined by a plurality of heat transfer elements extending into the cooling channel non-parallel to the primary flow direction.

The composite component of any preceding clause, wherein the CMC outer portion defines an airfoil and the additively printed inner portion is positioned in a trailing edge region of the airfoil.

The composite component of any preceding clause, wherein the CMC outer portion defines an airfoil and the additively printed inner portion is positioned in a leading edge region of the airfoil.

The composite component of any preceding clause, wherein the CMC outer portion defines an airfoil and the additively printed inner portion is positioned adjacent a suction side of the airfoil.

The composite component of any preceding clause, wherein the CMC outer portion defines a nozzle airfoil assembly comprising an inner band and an outer band, and the additively printed inner portion is positioned in the at least one of the inner band or the outer band.

The composite component of any preceding clause, wherein the CMC outer portion defines a shroud comprising an outer surface radially positioned adjacent a plurality of rotatable blades and the additively printed inner portion on is positioned adjacent the outer surface.

The composite component of any preceding clause, wherein the CMC outer portion is formed by chemical vapor infiltration of a preform or a plurality of plies laminated on the additively printed inner portion.

The composite component of any preceding clause, wherein the CMC outer portion is formed by melt infiltration of a preform or a plurality of plies laminated on the additively printed inner portion.

The composite component of any preceding clause, wherein the CMC outer portion encases the additively printed inner portion.

A composite component for a gas turbine engine, comprising: an additively printed inner portion defining at least one cooling channel having an inlet and an outlet, the additively printed inner portion having an outer surface; a ceramic matrix composite (CMC) outer portion substantially surrounding the additively printed inner portion such that the CMC outer portion is in contact with the outer surface, the CMC outer portion having a cover outer surface, wherein the outlet of the at least one cooling channel extends to the cover outer surface.

The composite component of any preceding clause, wherein the CMC outer portion defines a hollow airfoil having a cooling cavity therein, and wherein the at least one first flowpath feature extends from the cooling cavity to the cover outer surface of the CMC outer portion.

The composite component of any preceding clause, wherein the additively printed inner portion comprises SiC, and wherein the CMC outer portion comprises a fiber-reinforced ceramic matrix, and wherein the ceramic matrix comprises SiC.

The composite component of any preceding clause, wherein the CMC outer portion defines a hollow airfoil, wherein the at least one flowpath feature includes the cooling cavity, and wherein the at least one first flowpath feature extends non-linearly from the cooling cavity to an exterior surface of the hollow airfoil.

The composite component of any preceding clause, wherein the hollow airfoil has a pressure side opposite a suction side and a leading edge opposite a trailing edge, the pressure side and the suction side extending along an axial direction between the leading edge and the trailing edge with a non-linear, curved geometry and extending along a radial direction over a span, wherein the at least one cooling channel is positioned adjacent the leading edge, and wherein the at least one first flowpath feature includes a plurality of cooling passages spaced along the span, each extending adjacent the suction side from an inlet in the at least one cooling channel to an outlet at the trailing edge with a non-linear, curved geometry along the axial direction conforming to the non-linear, curved geometry of the suction side.

The composite component of any preceding clause, wherein the additively printed inner portion comprises a plurality of layers formed by: depositing a layer of additive material on a bed of an additive manufacturing machine; and selectively directing energy from an energy source onto the layer of additive material to fuse a portion of the additive material, wherein the additively printed inner portion is integrally formed as a single monolithic component.

A composite component, comprising: an insert defining at least one cooling channel having an inlet and an outlet, the insert having an insert outer surface; a composite cover surrounding the insert such that the composite cover is in contact with the insert outer surface, the composite cover having a cover outer surface, wherein the outlet of the at least one cooling channel extends to the cover outer surface.

The composite component of any preceding clause, wherein the insert is formed from a first material, wherein the composite cover is formed from a second material, and wherein one or more properties of the first material and the second material are the same.

The composite component of any preceding clause, wherein the first material is a monolithic ceramic material and the second material is a fiber-reinforced ceramic matrix composite material.

The composite component of any preceding clause, wherein the composite component is an airfoil having a pressure side opposite a suction side and a leading edge opposite a trailing edge, the pressure side and the suction side extending along an axial direction between the leading edge and the trailing edge and extending along a radial direction over a span, wherein the at least one cooling channel is a plurality of cooling channels, each cooling channel of the plurality of cooling channels having an inlet and an outlet, and wherein the outlet of each cooling channel is defined at the cover outer surface adjacent the trailing edge.

The composite component of any preceding clause, further comprising: a component cavity for receipt of a cooling fluid, wherein the trailing edge is defined by a trailing edge portion positioned aft of the component cavity, and wherein the insert is disposed in the trailing edge portion such that a midline of the insert extending along the axial direction is closer to one of the pressure side or the suction side than the other of the pressure side or the suction side.

The composite component of any preceding clause, further comprising: a component cavity for receipt of a cooling fluid, wherein the insert is positioned aft of the component cavity, and wherein a feed channel extends from the component cavity to the inlet of each cooling channel of the plurality of cooling channels.

The composite component of any preceding clause, further comprising: a component cavity for receipt of a cooling fluid, wherein the insert is positioned aft of the component cavity, wherein the insert defines an insert cavity extending along at least a portion of the span, and wherein at least one feed channel extends from the component cavity to the insert cavity.

The composite component of any preceding clause, further comprising: a component cavity for receipt of a cooling fluid, wherein a feed channel extends from the component cavity to the inlet of the at least one cooling channel.

The composite component of any preceding clause, further comprising: a component cavity for receipt of a cooling fluid, wherein the composite component is an airfoil having a pressure side opposite a suction side and a leading edge opposite a trailing edge, the pressure side and the suction side extending along an axial direction between the leading edge and the trailing edge and extending along a radial direction over a span, and wherein the insert is positioned adjacent the leading edge.

The composite component of any preceding clause, further comprising: a component cavity for receipt of a cooling fluid, wherein the composite component is an airfoil having a pressure side opposite a suction side and a leading edge opposite a trailing edge, the pressure side and the suction side extending along an axial direction between the leading edge and the trailing edge and extending along a radial direction over a span, wherein the insert is positioned between the leading edge and the trailing edge along the axial direction, and wherein the insert is positioned adjacent one of the pressure side and the suction side.

The composite component of any preceding clause, further comprising: a component cavity for receipt of a cooling fluid; and a feed channel; and an ejection channel, wherein the at least one cooling channel is configured as an insert manifold for receipt of the cooling fluid, wherein the insert manifold has a depth, the depth perpendicular to a length defined between the inlet of the at least one cooling channel and the outlet of the at least one cooling channel, wherein the feed channel extends from a feed channel inlet defined at the component cavity to a feed channel outlet at the insert manifold, and wherein the ejection channel extends from an ejection channel inlet defined at the insert manifold to an ejection channel outlet at the cover outer surface.

The composite component of any preceding clause, wherein the composite component extends along a radial direction between an inner end and an outer end, wherein the insert extends along the radial direction from the inner end to the outer end, wherein the insert extends along a direction perpendicular to the radial direction between a first end and a second end, wherein the insert defines a serpentine cavity for receipt of a cooling fluid, the serpentine cavity having a cavity inlet adjacent one of the first end or the second end, and wherein the serpentine cavity comprises at least a first change of direction adjacent one of the inner end or the outer end and a second change of direction adjacent the other of the inner end or the outer end.

The composite component of any preceding clause, wherein the composite component is a nozzle airfoil assembly comprising at least one of an inner band or an outer band, and wherein the insert is disposed in the at least one of the inner band or the outer band.

The composite component of any preceding clause, wherein the nozzle airfoil assembly defines a component cavity, and wherein the inlet of the at least one cooling channel is defined at the component cavity.

The composite component of any preceding clause, wherein the composite component is a shroud positioned radially adjacent a plurality of blades.

The composite component of any preceding clause, wherein the insert defines a plurality of cooling channels, each cooling channel of the plurality of cooling channels having an inlet and an outlet, and wherein the outlet of each cooling channel of the plurality of cooling channels is defined at the cover outer surface.

The composite component of any preceding clause, wherein the insert comprises a plurality of heat transfer elements extending into the at least one cooling channel.

The composite component of any preceding clause, wherein the at least one cooling channel is configured as an insert manifold for receipt of a cooling fluid, wherein the insert manifold has a depth, the depth perpendicular to a length defined between the inlet of the at least one cooling channel and the outlet of the at least one cooling channel, and wherein the insert comprises a plurality of heat transfer elements extending into the insert manifold.

The composite component of any preceding clause, wherein the insert comprises a plurality of layers formed by: depositing a layer of additive material on a bed of an additive manufacturing machine; and selectively directing energy from an energy source onto the layer of additive material to fuse a portion of the additive material, wherein the insert is integrally formed as a single monolithic component.

The composite component of any preceding clause, wherein the CMC outer portion encases the additively printed inner portion.

A method for forming a composite component for a gas turbine engine, comprising: substantially surrounding an additively printed inner portion within a preform or plurality of plies laminated on the additively printed inner portion; and infiltrating, via chemical vapor infiltration or melt infiltration, the preform or the plurality of plies with silicon to form a CMC outer portion having a cover outer surface.

The method of any preceding clause, wherein the additively printed inner portion defining at least one cooling channel having an inlet and an outlet.

The method of any preceding clause, wherein the outlet of the at least one cooling channel is in fluid communication through the cover outer surface.

A method for forming a composite component, comprising: forming an insert defining at least one cooling channel having an inlet and an outlet, the insert having an insert outer surface; disposing the insert within a composite cover having a cover outer surface, the composite cover surrounding the insert such that the composite cover is in contact with the insert outer surface, wherein the outlet of the at least one cooling channel extends to the cover outer surface.

The method of any preceding clause, wherein the CMC outer portion encases the additively printed inner portion.

This written description uses examples to disclose the present disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

We claim:

1. A composite component for a gas turbine engine, the composite component comprising:
   an additively printed inner portion defining at least one flowpath feature, wherein the additively printed inner portion comprises SiC,
   wherein the additively printed inner portion comprises a plurality of monolithic layers comprising SiC;
   a ceramic matrix composite (CMC) outer portion formed on the additively printed inner portion such that the CMC outer portion substantially surrounds the additively printed inner portion and defines an outer surface of the composite component, and wherein the additively printed inner portion defines at least part of the outer surface of the composite component,
   wherein the CMC outer portion comprises a fiber-reinforced ceramic matrix and defines at least one cooling cavity fluidly coupled to the at least one flowpath feature of the additively printed inner portion, wherein the fiber reinforced ceramic matrix comprises SiC.

2. The composite component of claim 1, wherein the at least one flowpath feature of the additively printed inner portion has a non-linear geometry.

3. The composite component of claim 1, wherein the CMC outer portion defines a linear channel fluidly coupling the at least one flowpath feature and the at least one cooling cavity.

4. The composite component of claim 1, wherein the CMC outer portion defines a hollow airfoil having the at least one cooling cavity therein, and wherein the at least one flowpath feature extends non-linearly from the at least one cooling cavity to an exterior surface of the hollow airfoil.

5. The composite component of claim 4, wherein the hollow airfoil has a pressure side opposite a suction side and a leading edge opposite a trailing edge, the pressure side and the suction side extending along an axial direction between the leading edge and the trailing edge with a non-linear, curved geometry and extending along a radial direction over a span, wherein the at least one cooling cavity is positioned adjacent the leading edge, and wherein the at least one flowpath feature includes a plurality of cooling channels spaced along the span, each extending adjacent the suction side from an inlet in the at least one cooling cavity to an outlet at the trailing edge with a non-linear, curved geometry along the axial direction conforming to the non-linear, curved geometry of the suction side.

6. The composite component of claim 5, wherein the at least one flowpath feature includes at least one cooling channel of the plurality of cooling channels having a primary flow direction and an interior surface defined by a plurality of heat transfer elements extending into the cooling channel non-parallel to the primary flow direction.

7. The composite component of claim 1, wherein the CMC outer portion defines an airfoil and the additively printed inner portion is positioned in a trailing edge region of the airfoil.

8. The composite component of claim 1, wherein the CMC outer portion defines an airfoil and the additively printed inner portion is positioned in a leading edge region of the airfoil.

9. The composite component of claim 1, wherein the CMC outer portion defines an airfoil and the additively printed inner portion is positioned adjacent a suction side of the airfoil.

10. The composite component of claim 1, wherein the CMC outer portion defines a nozzle airfoil assembly comprising an inner band and an outer band, and the additively printed inner portion is positioned in at least one of the inner band or the outer band.

11. The composite component of claim 1, wherein the CMC outer portion defines a shroud comprising an outer surface radially positioned adjacent a plurality of rotatable blades and the additively printed inner portion is positioned adjacent the outer surface of the shroud.

12. The composite component of claim 1, wherein the CMC outer portion is formed by chemical vapor infiltration of a preform or a plurality of plies laminated on the additively printed inner portion.

13. The composite component of claim 1, wherein the CMC outer portion is formed by melt infiltration of a preform or a plurality of plies laminated on the additively printed inner portion.

14. The composite component of claim 1, wherein the CMC outer portion encases the additively printed inner portion.

15. A composite component for a gas turbine engine, comprising:

an additively printed inner portion defining at least one cooling channel having an inlet and an outlet, the additively printed inner portion having an outer surface, wherein the additively printed inner portion comprises a plurality of monolithic layers comprising SiC;

a ceramic matrix composite (CMC) outer portion substantially surrounding the additively printed inner portion such that the CMC outer portion is in contact with the outer surface, the CMC outer portion having a cover outer surface, wherein the cover outer surface and at least part of the outer surface of the additively printed inner portion define at least part of an outer surface of the composite component, wherein the outlet of the at least one cooling channel extends to the outer surface of the composite component.

16. The composite component of claim 15, wherein the CMC outer portion defines a hollow airfoil having a cooling cavity therein, and wherein the at least one cooling channel extends from the cooling cavity to the outer surface of the composite component.

17. The composite component of claim 15, wherein the CMC outer portion comprises a fiber-reinforced ceramic matrix, and wherein the fiber-reinforced ceramic matrix comprises SiC.

18. The composite component of claim 15, wherein the CMC outer portion defines a hollow airfoil, wherein the at least one cooling channel extends non-linearly to an exterior surface of the hollow airfoil.

19. The composite component of claim 18, wherein the hollow airfoil has a pressure side opposite a suction side and a leading edge opposite a trailing edge, the pressure side and the suction side extending along an axial direction between the leading edge and the trailing edge with a non-linear, curved geometry and extending along a radial direction over a span, wherein the at least one cooling channel is positioned adjacent the leading edge, and wherein the at least one first flowpath feature includes a plurality of cooling passages spaced along the span, each extending adjacent the suction side from an inlet in the at least one cooling channel to an outlet at the trailing edge with a non-linear, curved geometry along the axial direction conforming to the non-linear, curved geometry of the suction side.

* * * * *